(12) United States Patent
Mimaroglu et al.

(10) Patent No.: US 11,544,632 B2
(45) Date of Patent: Jan. 3, 2023

(54) NON-INTRUSIVE LOAD MONITORING USING ENSEMBLE MACHINE LEARNING TECHNIQUES

(71) Applicant: Oracle International Corporation, Redwood Shores, CA (US)

(72) Inventors: Selim Mimaroglu, Arlington, VA (US); Anqi Shen, Arlington, VA (US); Arhan Gunel, Arlington, VA (US); Oren Benjamin, Arlington, VA (US)

(73) Assignee: Oracle International Corporation, Redwood Shores, CA (US)

( * ) Notice: Subject to any disclaimer, the term of this patent is extended or adjusted under 35 U.S.C. 154(b) by 497 days.

(21) Appl. No.: 16/698,338

(22) Filed: Nov. 27, 2019

(65) Prior Publication Data

US 2021/0158225 A1    May 27, 2021

(51) Int. Cl.
*G06N 20/20*   (2019.01)
*H02J 3/00*    (2006.01)
(Continued)

(52) U.S. Cl.
CPC ............... *G06N 20/20* (2019.01); *G06N 5/04* (2013.01); *H02J 3/003* (2020.01); *H02J 13/00002* (2020.01); *H02J 2203/20* (2020.01)

(58) Field of Classification Search
CPC ........ G06N 20/20; G06N 5/04; G06N 3/0454; G06N 3/08; H02J 3/003; H02J 13/00002;
(Continued)

(56) References Cited

U.S. PATENT DOCUMENTS

| 4,858,141 | A | * | 8/1989 | Hart | .................. | G01R 21/1331 |
| | | | | | | 340/657 |
| 8,275,561 | B2 | | 9/2012 | Alles | | |

(Continued)

FOREIGN PATENT DOCUMENTS

| CN | 108899892 A | 11/2018 |
| WO | 2019155214 A1 | 8/2019 |

OTHER PUBLICATIONS

Gaochen et al., Estimation of Target Appliance Electricity Consumption Using Background Filtering, IEEE Transactions on Smart Grid, IEEE, USA, vol. 10, No. 6, Nov. 1, 2019, pp. 5920-5929.

(Continued)

*Primary Examiner* — Ziaul Karim
(74) *Attorney, Agent, or Firm* — Potomac Law Group, PLLC

(57) ABSTRACT

Embodiments implement non-intrusive load monitoring using ensemble machine learning techniques. A first trained machine learning model configured to disaggregate target device energy usage from source location energy usage and a second trained machine learning model configured to detect device energy usage from source location energy usage can be stored, where the first trained machine learning model is trained to predict an amount of energy usage for the target device and the second trained machine learning model is trained to predict when a target device has used energy. Source location energy usage over a period of time can be received, where the source location energy usage includes energy consumed by the target device. An amount of disaggregated target device energy usage over the period of time can be predicted, using the first and second trained machine learning models, based on the received source location energy usage.

20 Claims, 18 Drawing Sheets

(51) Int. Cl.
*H02J 13/00* (2006.01)
*G06N 5/04* (2006.01)

(58) Field of Classification Search
CPC ..... H02J 2203/20; G06Q 50/06; G06Q 10/04; G06K 9/6256
See application file for complete search history.

(56) References Cited

U.S. PATENT DOCUMENTS

| | | | |
|---|---|---|---|
| 8,340,831 B2 | 12/2012 | Benitez et al. | |
| 9,612,286 B2 | 4/2017 | Gupta et al. | |
| 2010/0305889 A1* | 12/2010 | Tomlinson, Jr. | G06N 7/005 702/62 |
| 2011/0144819 A1 | 6/2011 | Andrews et al. | |
| 2011/0301894 A1 | 12/2011 | Sanderford | |
| 2012/0278272 A1 | 11/2012 | Kim et al. | |
| 2013/0110621 A1 | 5/2013 | Gupta et al. | |
| 2013/0231795 A1* | 9/2013 | G | G06F 17/18 700/295 |
| 2013/0289788 A1* | 10/2013 | Gupta | H02J 3/14 700/291 |
| 2013/0338948 A1 | 12/2013 | Zeifman | |
| 2014/0207298 A1* | 7/2014 | Gupta | G05B 15/02 700/291 |
| 2015/0268281 A1* | 9/2015 | Haghighat-Kashani | G01R 21/133 702/62 |
| 2017/0322579 A1* | 11/2017 | Goparaju | G06N 20/00 |
| 2018/0328967 A1* | 11/2018 | Lange | G01R 31/2825 |
| 2018/0348711 A1 | 12/2018 | Gupta et al. | |
| 2018/0356770 A1 | 12/2018 | ElBsat et al. | |
| 2020/0286587 A1 | 9/2020 | Israeli et al. | |
| 2021/0098134 A1 | 4/2021 | Zhang et al. | |
| 2021/0381992 A1 | 12/2021 | Aguiar | |

OTHER PUBLICATIONS

International Search Report and Written Opinion issued in the corresponding International Application No. PCT/US2020/051182, dated Nov. 18, 2020.

International Search Report and Written Opinion issued in the International Application No. PCT/US2020/050986 dated Dec. 11, 2020.

International Search Report and Written Opinion issued in the International Application No. PCT/US2020/051186, dated Dec. 11, 2020.

Kelly et al., Neural NILM: Deep Neural Networks Applied to Energy Disaggregation, Proceedings of the 2nd ACM International Conference on Embedded Systems for Energy-Efficient Built Environments, Buildsys '15, Jan. 1, 2015, pp. 55-64.

Unknown, Ensemble learning, Wikipedia, Sep. 3, 2019, Retrieved from the internet https://en.wikipedia.org/w/index.php?title=Ensemble_learning&oldid=913844668.

Unknown, Nonintrusive load monitoring, Wikipedia, Oct. 12, 2019, Retrieved from the internet https://en.wikipedia.org/w/index.php?title=Nonintrusive_load_monitoring&oldid=920917729.

Hart, "Nonintrusive appliance load monitoring," Proceedings of the IEEE, vol. 80, No. 12, pp. 1870-1891, 1992.

Kim et al., "Nonintrusive Load Monitoring Based on Advanced Deep Learning and Novel Signature", Published Oct. 2, 2017, pp. 1-22.

Thi-Thu-Huong Le, et al., "Non-Intrusive Load Monitoring Based on Novel Transient Signal in Household Appliances with Low Sampling Rate", Dec. 5, 2018, pp. 1-35, energies.

* cited by examiner

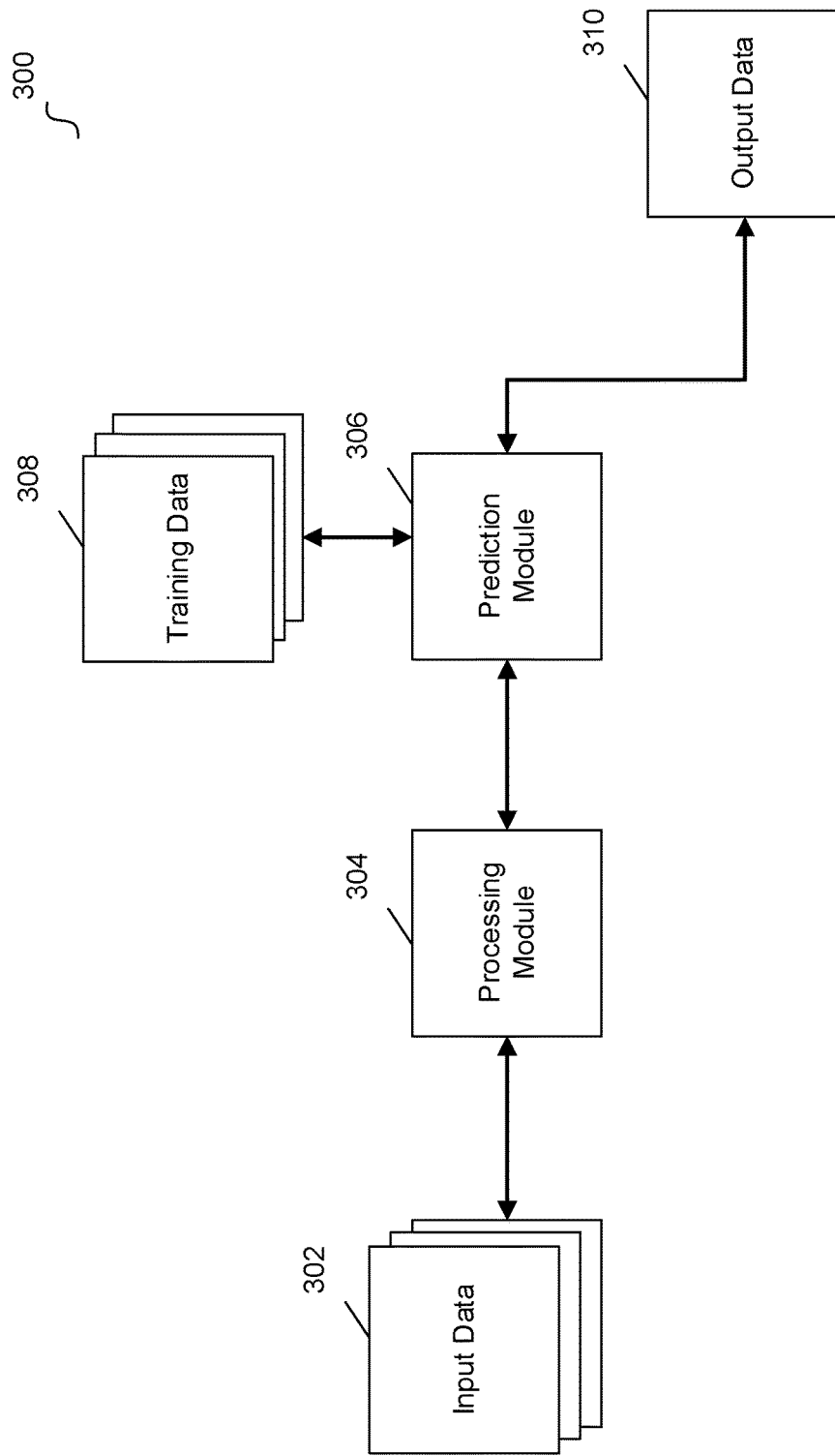

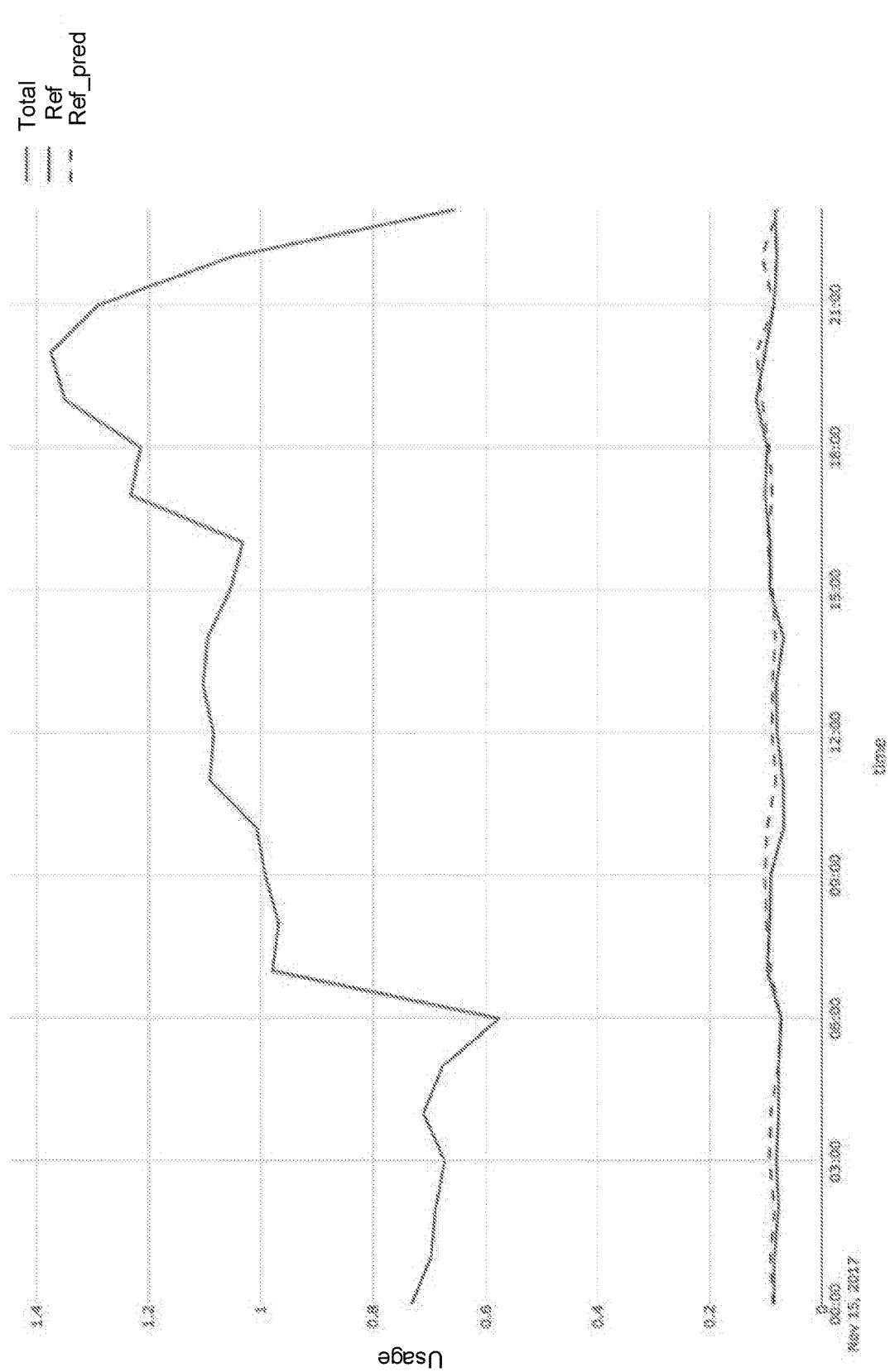

NON-INTRUSIVE LOAD MONITORING USING ENSEMBLE MACHINE LEARNING TECHNIQUES

FIELD

The embodiments of the present disclosure generally relate to utility metering devices, and more particularly to non-intrusive load monitoring using utility metering devices.

BACKGROUND

Non-intrusive load monitoring ("NILM") and disaggregation of various energy usage devices at a given source location has proven challenging. For example, given a household, disaggregating device and/or electric vehicle energy usage from within the household's general monitored energy usage has been difficult to achieve, in part due to the large variety of household devices and/or electric vehicles (e.g., make, model, year, etc.). Advancements in metering devices have provided some opportunities, yet successful disaggregation has still been elusive. The limited availability of labeled data sets, or source location energy usage values with labeled device energy usage values (e.g., energy usage values for a household labeled with energy usage values for appliance 1, electric vehicle 1, appliance 2, and the like), has further impeded progress. NILM and disaggregation techniques that can learn from these limited data sets to successfully predict energy usage of a target device from the general energy usage at a source location would therefore greatly improve the technological field and benefit users that implement these techniques.

SUMMARY

The embodiments of the present disclosure are generally directed to systems and methods for non-intrusive load monitoring using ensemble machine learning techniques. A first trained machine learning model configured to disaggregate target device energy usage from source location energy usage can be stored, where the first trained machine learning model is trained to predict an amount of energy usage for the target device from source location energy usage. A second trained machine learning model configured to detect device energy usage from source location energy usage can be stored, where the second trained machine learning model is trained to predict when a target device has used energy from source location energy usage. Source location energy usage over a period of time can be received, where the source location energy usage includes energy consumed by the target device. An amount of disaggregated target device energy usage over the period of time can be predicted, using the first trained machine learning model and the second trained machine learning model, based on the received source location energy usage.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 3 illustrates a flow diagram for using a machine learning model to disaggregate energy usage associated with a target device according to an example embodiment.

FIGS. 5A-5G illustrate sample graphs that represent device specific disaggregation according to example embodiments.

DETAILED DESCRIPTION

Figure 1:
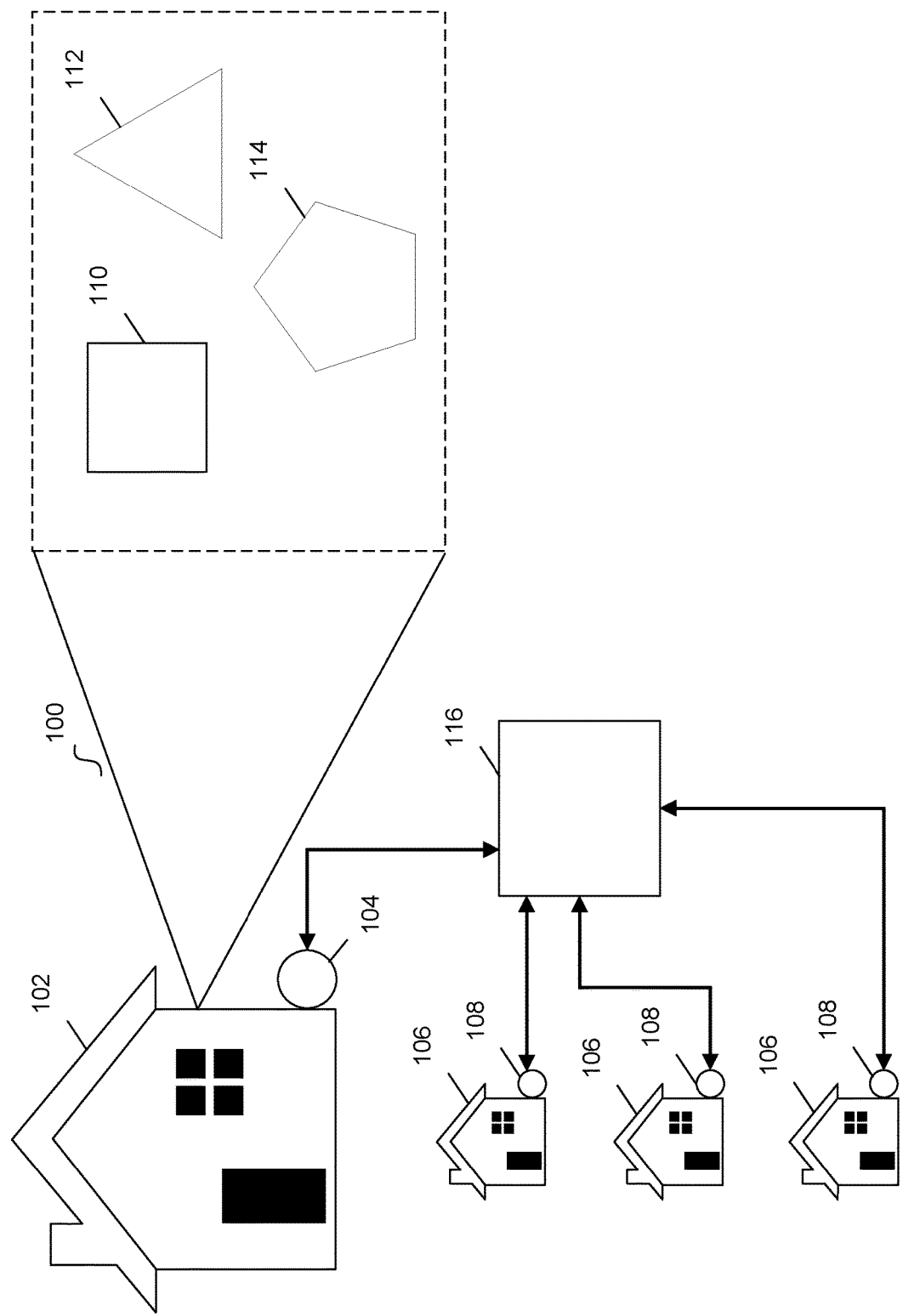
FIG. 1 illustrates a system for disaggregating energy usage associated with a target device according to an example embodiment.

Embodiments perform non-intrusive load monitoring using a novel learning scheme. NILM and disaggregation refers to taking as input total energy usage at a source location (e.g., energy usage at a household provided by advanced metering infrastructure) and estimating energy usage for one or more appliances, electric vehicles, and other devices that use energy at the source location. Embodiments leverage a trained machine learning model to predict energy usage of a target device based on general energy usage at a source location. For example, the target device may be a large appliance or electrical vehicle, the source location may be a household, and the trained machine learning model can receive the energy usage of the household as input and predict the energy usage of the target device (e.g., energy usage of the target device that is included in the energy usage of the household as a whole).

Embodiments train a machine learning model using labeled energy usage data. For example, a machine learning model can be designed/selected, such as a neural network. Energy usage data from multiple source locations (e.g., households) can be obtained, where the energy usage data can be labeled with device specific energy usage. For example, the household energy usage values can cover a period of time, and within that period of time individual device energy usage values (e.g., appliance 1, electric vehicle 1, appliance 2, and the like) can be labeled. In some embodiments, this household and device specific energy usage can then be processed to generate training data for the machine learning model.

In some embodiments, the machine learning model can be trained to predict (e.g., disaggregate) energy usage for a target device. For example, the training data can include target device specific energy usage at a number of different source locations (e.g., households), and thus the machine learning model can be trained to identify trends in the training data and predict target device energy usage. In some embodiments, while the machine learning model is trained to predict target device energy usage, the training can include energy usage predictions/loss calculations/gradient updates for one or more other devices. For example, a set of other devices can be included with the target device when implementing embodiments of the training techniques (e.g., prediction generation, loss calculation, gradient propagation, accuracy improvements, and the like) for the machine learning model.

In some embodiments, the set of other devices can be based on the training data and/or device specific labeled data values available within the training data. For example, the availability of energy usage data for a source location that is labeled with device specific energy usage can be limited. Embodiments include a correspondence between the set of other devices used within the techniques for training the machine learning model and the labeled device specific energy usage data values available in the training data. In other words, the labeled device specific energy usage data values available in the training data can include labels for a number of different devices, there may be many different combinations of devices that appear within a given source location of the training data, and the frequency with which different devices appear together at the same source location can vary. The set of other devices used within the training techniques can be based on the device diversity within the training data, the different combinations of devices at given source locations, and/or the frequency of appearance for different combinations of devices.

In some embodiments, when training data for the set of other devices is used in combination with training data for the target device, the training techniques can include the target device and the set of other devices. This implementation enables the trained machine learning model to use features learned based on the set of other devices to more accurately predict energy usage/disaggregation for the target device. In some embodiments, the correspondence between the set of other devices and the available training data further bolsters the training/prediction/accuracy advantages realized by including the set of other devices.

Embodiments use the total energy in a household provided by advanced metering infrastructure (AMI) to accurately estimate or predict corresponding device specific energy usage. The domain of non-intrusive load monitoring (NILM) has drawn significant research interest, such as the insights described in Hart, George W., "Nonintrusive appliance load monitoring," Proceedings of the IEEE, vol. 80, no. 12, pp. 1870-1891, 1992. Accurate disaggregation via NILM provides many benefits including energy savings opportunities, personalization, improved electric grid planning, and more.

Embodiments utilize a deep learning scheme that can, based on limited training sets, accurately disaggregate power loads of many energy consuming devices, such as large household appliances and electric vehicles. Accurate disaggregation can be challenging due to the variety of energy consuming devices, such as those in a common household (e.g., large electric appliances and electric vehicles) and their corresponding use conditions. In addition, in the NILM domain, the availability of training data can be limited. Therefore, learning schemes that can maximize the benefits of training datasets can be particularly effective.

In embodiments, training data can be used to train learning models designed to effectively learn in these challenging conditions. Input to the learning models can be provided by AMI along with other types of inputs. Embodiments can accurately predict electric device energy usage in high and low granularities/resolutions (e.g., at 1 min, 5 mins, 15 mins, 30 mins, 1 hour, or more).

Embodiments utilize a learning scheme for NILM that is designed for target device disaggregation, however one or more other non-target devices can be used within the learning schemes. For example, a subset of the training dataset can include labeled target device energy usage, which in turn yields larger training sets. Within the NILM domain, metered training data can be limited and within datasets the number of labeled devices at any given site can be limited.

Conventional NILM implementations with existing learning schemes have their own shortcomings. Some of the proposed approaches previously considered are built on combinatorial optimization, Bayesian methods, Hidden Markov Models, or Deep Learning. However, many of these models are not useful in real world scenarios because they suffer from various drawbacks. For example, some of these solutions are computationally expensive, and thus impractical. Others require high resolution/granularity input (e.g., AMI data or training data) which is often unavailable or impractical given deployed metering capabilities.

For example, one proposed approach focuses on a plurality of energy consuming devices, however this scenario does not take advantage of limited training data sets due to the constraint of requiring multiple labeled energy consuming devices at the same source location (e.g., to effectively train). This results in poor utilization of training data sets. Another proposed approach selects a target device from the training data set but does not use other devices within the learning schemes. In this case, the limited number of devices that participate in the learning limits the effectiveness of the system. Embodiments solve NILM problems accurately in a practical time and under real world constraints.

Embodiments effectively utilize the limited training data sets in the domain by using the target device and also non-target devices within the learning schemes. For example, learning can be performed based on non-target devices (e.g., labeled energy usage, loss calculations, and gradient propagation), however invalid entries in the training data, such as missing labeled data, can be replaced by a value of zero rather than being discarded. This form of data curation achieves accurate disaggregation prediction for the target device by also utilizing data from non-target devices. For example, training can take place on the curated/processed data set. Embodiments can accurately predict target device disaggregation with flexibility. While training for the target device, models can learn from the other non-target devices, from a subset training data, or any combination of these. This flexibility achieves better training data utilization and results in higher levels of accuracy for target device disaggregation.

Embodiments can use data (e.g., training and/or input) from any suitable meter (e.g., AMI or others), and the utilized data (e.g., training and/or input) can have low granularities, such as 15 mins, 30 min, or an hour. The disaggregated energy usage predictions for a target device can be useful for many reasons: providing energy savings opportunities for utilities and their customers; providing personalization opportunities; enabling better grid planning including peak time demand management. For example, electric utilities can invest in techniques for disaggregating energy usage from large appliances or devices. Motivations for these investments include the advancement of AMI and smart grid technologies, a growing interest in energy efficiency, interest from customers for better information, and the like.

Some embodiments implement an architecture on a deep learning framework that includes a Convolutional Neural Network ("CNN"). The architecture is also extensible and can be tailored with respect to the size of the input and output. The functionality of the deep learning framework, such as initialization of the layers, the implemented optimizer, regularization of values, dropout, and the like can be utilized, removed, or adjusted. In practice, many applications of CNNs are designed to recognize visual patterns (e.g., directly from images for classification). Examples include LeNet, AlexNet, ZFNet, GoogleNet/Inception, VGGNet, and ResNet. On the other hand, embodiments use a CNN architecture for predicting target device energy usage disaggregation. For example, the CNN can be designed to have a number of convolutional layers running in parallel with various kernel sizes and shapes. This design can be used to learn trends and other aspects of the metered energy usage data (e.g., over a granularity of 1 min, 5 mins, 15 mins, 30 mins, 1 hour, or more).

Some embodiments utilize multiple trained learning models to achieve greater prediction accuracy. For example, an ensemble approach can combine outputs from multiple trained models. Embodiments that implement the ensemble approach can achieve better accuracy by combining multiple deep learning models designed to solve disaggregation and detection/identification problems. For example, the output of these models can be combined in a number of potential ways to achieve optimal accuracy. Embodiments solve two distinct but related problems on the same input, disaggregation and detection/identification. Separate models can be used to more effectively solve each problem. The results from the disaggregation and detection/identification models can be combined in several ways: a) weighting on detection/identification; b) weighting on disaggregation; c) equally (or substantially equally) weighting on each model. For example, the particular manner of combining the two models into a final output can be based on multiple factors: thresholds, a distance between each model's prediction output, and the final output.

Embodiments train and build disaggregation and detection/identification models (e.g., for each target device). Depending on each model's distance (e.g., measured by a distance metric), from each other, and each model's distance from the labeled/known values, an ensemble/combination approach can be selected: a) weighting on detection/identification; b) weighting on disaggregation; c) equally (or substantially equally) weighting each model. Some embodiments may augment output with data values (e.g., threshold values), for example based on disagreement between the models. Implementations and results demonstrate improved disaggregation predictions for multiple energy consuming devices (e.g., large household appliances and/or electric vehicles) when combining the models into final output.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for disaggregating energy usage associated with a target device according to an example embodiment. System 100 includes source location 102, meter 104, source locations 106, meters 108, devices 110, 112, and 114, and network node 116. Source location 102 can be any suitable location that includes or is otherwise associated with devices that consume or produce energy, such as a household with devices 110, 112, and 114. In some embodiments, devices 110, 112, and 114 can be electrical appliances and/or electrical vehicles that use energy, such as a washer, dryer, air conditioner, heater, refrigerator, television, computing device, and the like. For example, source location 102 can be supplied with power (e.g., electricity), and devices 110, 112, and 114 can draw from the power supplied to source location 102. In some embodiments, source location 102 is a household and the power to the household is supplied from an electric power grid, a local power source (e.g., solar panels), a combination of these, or any other suitable source.

In some embodiments, meter 104 can be used to monitor the energy usage (e.g., electricity usage) at source location 102. For example, meter 104 can be a smart meter, an advanced metering infrastructure ("AMI") meter, an automatic meter reading ("AMR") meter, a simple energy usage meter, and the like. In some embodiments, meter 104 can transmit information about the energy usage at source location 102 to a central power system, a supplier, a third party, or any other suitable entity. For example, meter 104 can implement two-way communication with an entity in order to communicate the energy usage at source location 102. In some embodiments, meter 104 may implement one-way communication with an entity, where meter readings are transmitted to the entity.

In some embodiments, meter 104 can communicate over wired communication links and/or wireless communication links, and can leverage wireless communication protocols (e.g., cellular technology), Wi-Fi, wireless ad hoc networks over Wi-Fi, wireless mesh networks, low power long range wireless ("LoRa"), ZigBee, Wi-SUN, wireless local area networks, wired local area networks, and the like. Devices 110, 112, and 114 (and other devices not depicted) can use energy at source location 102, and meter 104 can monitor the energy usage for the source location and report the corresponding data (e.g., to network node 116).

In some embodiments, source locations 106 and meters 108 can be similar to source location 102 and meter 104. For example, networking node 116 can receive energy usage information about source location 102 and source locations 106 from meter 104 and meters 106. In some embodiments, network node 116 can be part of a central power system, a supplier, a power grid, an analytics service provider, a third-party entity, or any other suitable entity.

The following description includes recitations of a criterion or criteria. These terms are used interchangeably throughout the disclosure, the scope of criteria is intended to include the scope of criterion, and the scope of criterion is intended to include the scope of criteria.

Figure 2:
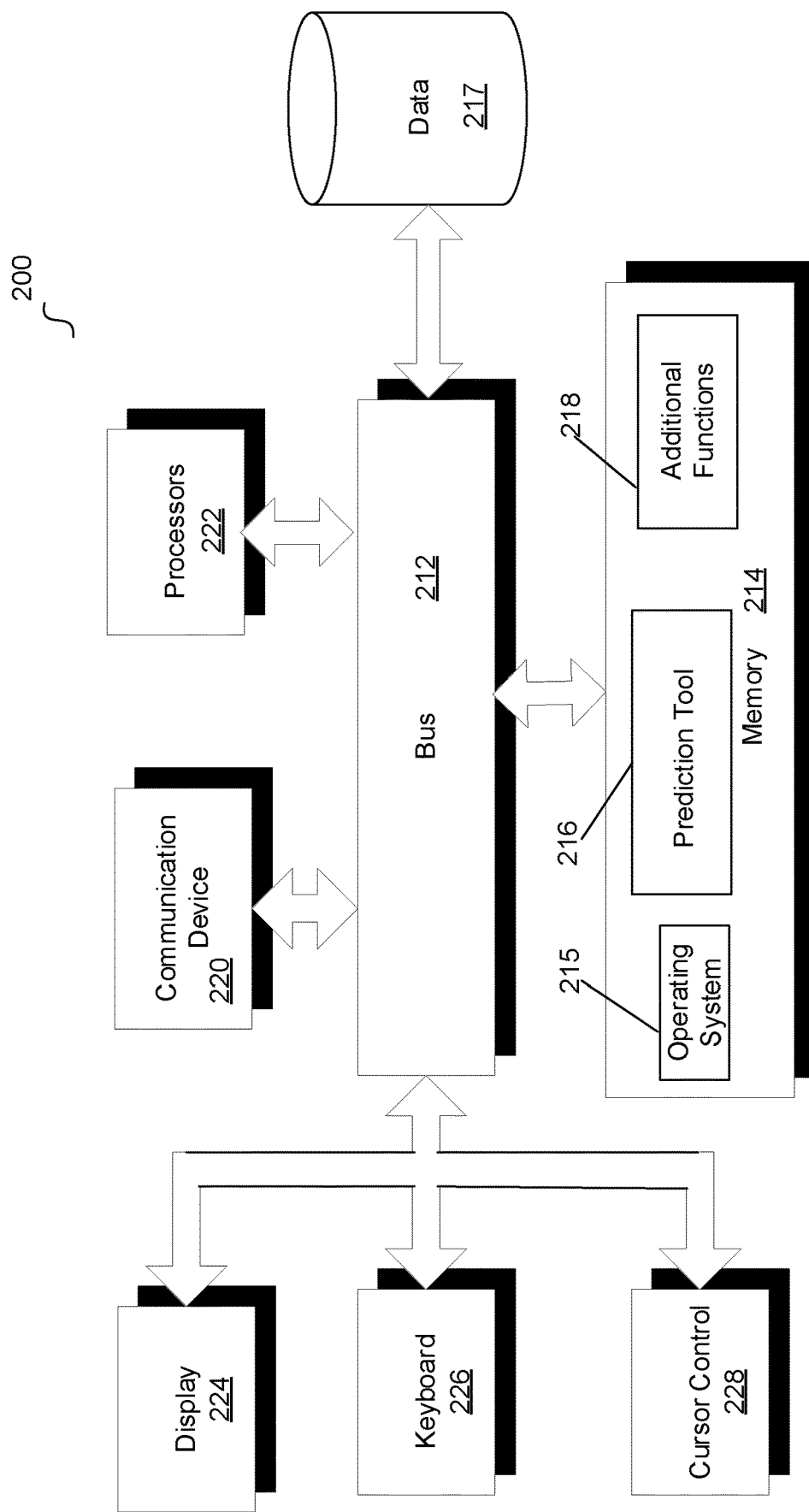
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, prediction tool 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, a prediction tool 216 that implements the NILM and disaggregation functionality disclosed herein, as well as other applications modules 218. Operating system 215 provides operating system functionality for system 200. In some instances, prediction tool 216 may be implemented as an in-memory configuration. In some implementations, when system 200 executes the functionality of prediction tool 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include various modules of Oracle® Utilities Customer Cloud Service, Oracle® Cloud Infrastructure, Oracle® Cloud Platform, Oracle® Cloud Applications, for example. Prediction tool 216, other applications module 218, and any other suitable component of system 200 can include various modules of Oracle® Data Science Cloud Service, Oracle® Data Integration Service, or other suitable Oracle® products or services.

A database 217 is coupled to bus 212 to provide centralized storage for modules 216 and 218 and to store, for example, data received by computer vision tool 216 or other data sources. Database 217 can store data in an integrated collection of logically related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component.

FIG. 3 illustrates a system for using a machine learning model to disaggregate energy usage associated with a target device according to an example embodiment. System 300 includes input data 302, processing module 304, prediction module 306, training data 308, and output data 310. In some embodiments, input data 302 can include energy usage from a source location, and the data can be processed by processing module 304. For example, processing module 304 can process input data 302 to generate features based on the input data.

In some embodiments, prediction module 306 can be a machine learning module (e.g., neural network) that is trained by training data 308. For example, training data 308 can include labeled data, such as energy usage data values from a plurality of source locations (e.g., source locations 102 and 106 from FIG. 1) that include labeled device specific energy usage data values. In some embodiments, the output from processing module 304, such as the processed input, can be fed as input to prediction module 306. Prediction model 306 can generate output data 310, such as disaggregated energy usage data for the input data 302. In some embodiments, input data 302 can be source location energy usage data and output data 310 can be disaggregated energy usage data for a target device (or a plurality of devices).

Embodiments use machine learning models, such as neural networks, to predict energy usage of a target device. Neural networks can include multiple nodes called neurons that are connected to other neurons via links or synapses. Some implementations of neural networks can be aimed at classification tasks and/or can be trained under supervised learning techniques. In many cases, labeled data can include features that help in achieving a prediction task (e.g., energy usage classification/prediction). In some embodiments, neurons in a trained neural network can perform a small mathematical operation on given input data, where their corresponding weights (or relevance) can be used to produce an operand (e.g., produced in part by applying a non-linearity) to be passed further into the network or given as the output. A synapse can connect two neurons with a corresponding weight/relevance. Prediction model 306 from FIG. 3 can be a neural network.

In some embodiments, a neural network can be used to learn trends within labeled energy usage data values (e.g., household energy usage data values labeled with device specific energy usage over a period of time). For example, the training data can include features and these features can be used by a neural network (or other learning model) to identify trends and predict energy usage from overall source location energy usage that is associated with the target device (e.g., disaggregate overall energy usage for a household to identify energy usage by the target device). In some embodiments, once a model is trained/ready it can be deployed. Embodiments can be implemented with a number of products or services (e.g., Oracle® products or services).

In some embodiments, the design of prediction module 306 can include any suitable machine learning model components (e.g., a neural network, support vector machine, specialized regression model, and the like). For example, a neural network can be implemented along with a given cost function (e.g., for training/gradient calculation). The neural network can include any number of hidden layers (e.g., 0, 1, 2, 3, or many more), and can include feed forward neural networks, recurrent neural networks, convolution neural networks, modular neural networks, and any other suitable type.

Figure 4A:
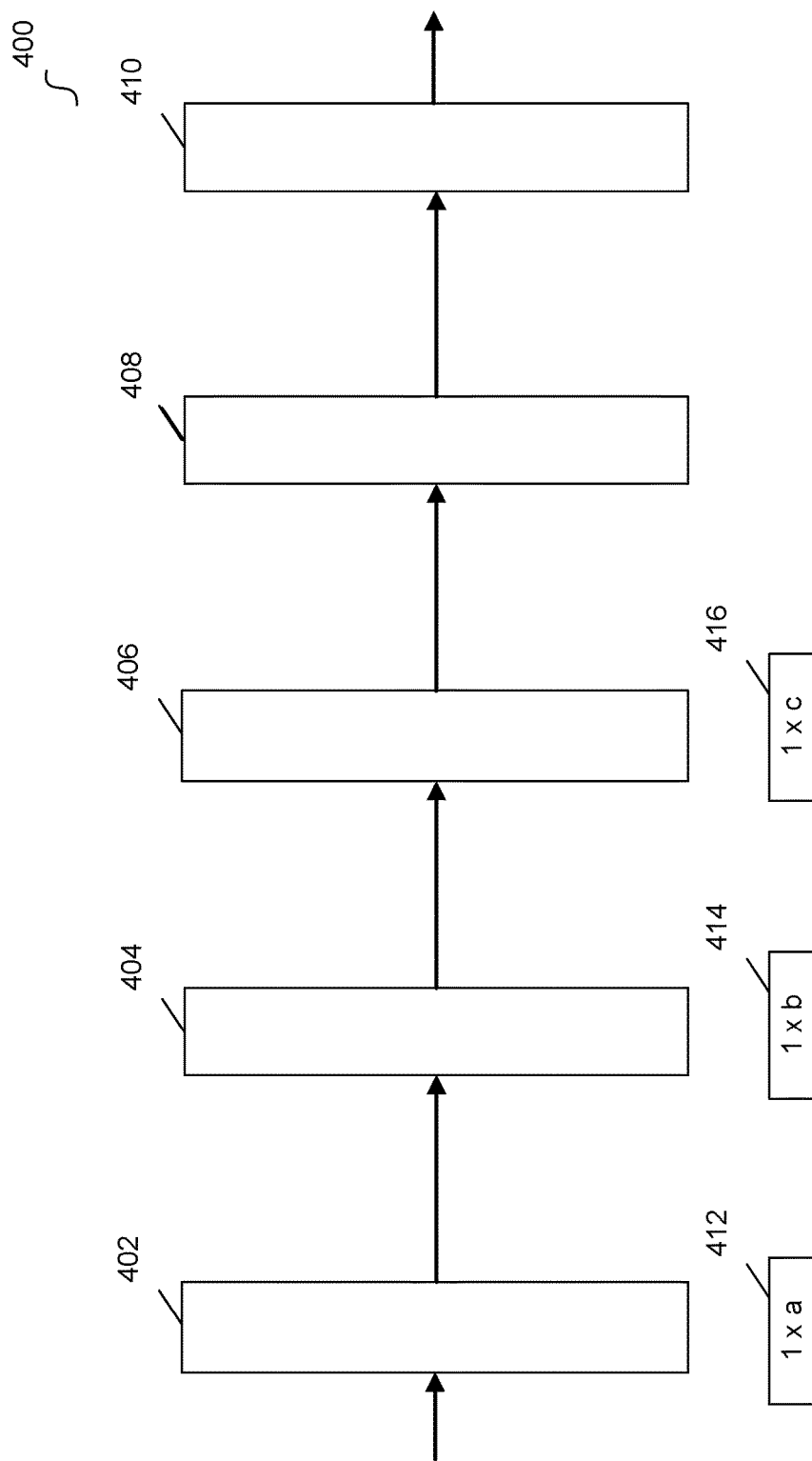
FIGS. 4A-4B illustrate sample convolutional neural networks according to example embodiments.
Figure 4B:
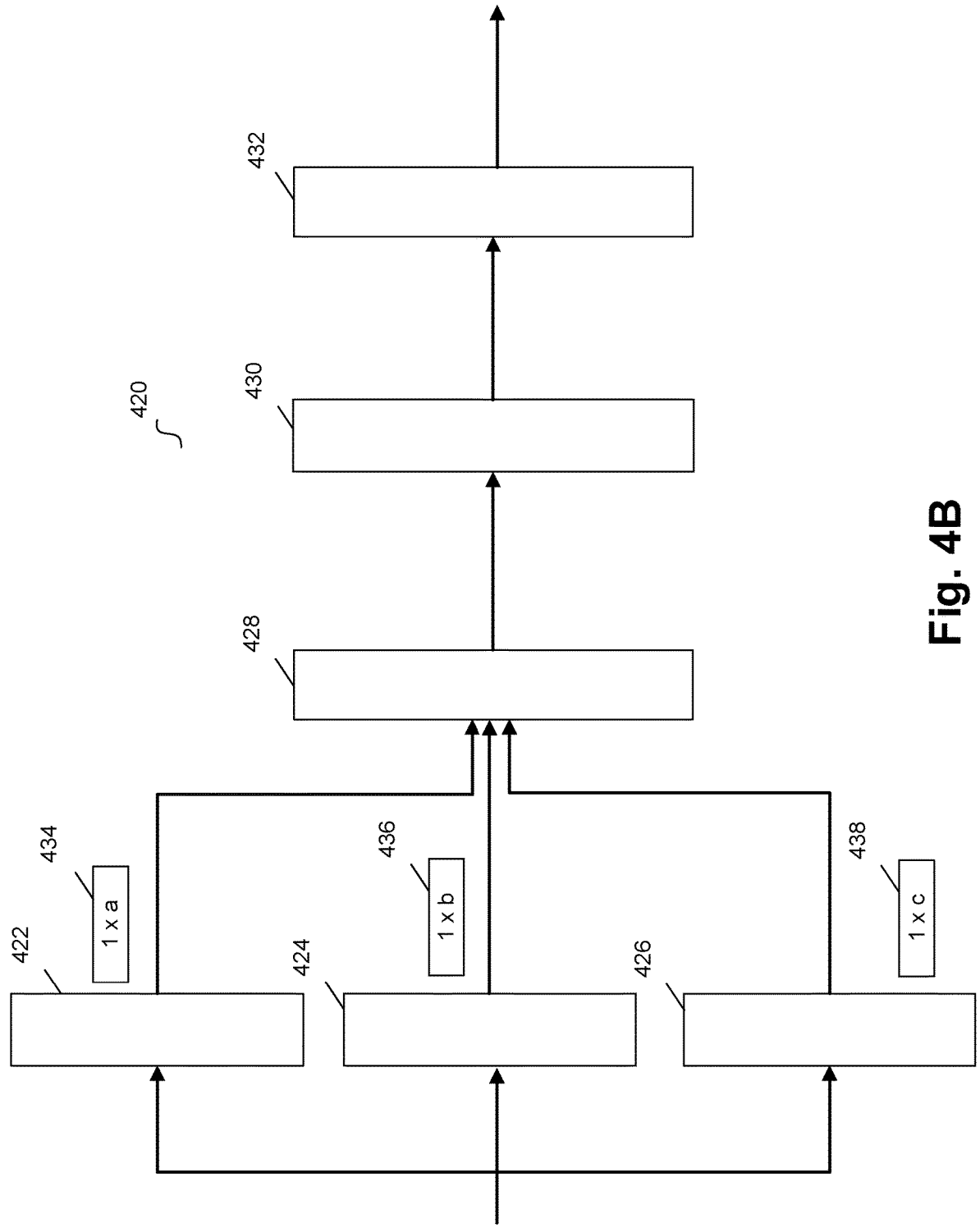

FIGS. 4A-4B illustrate sample convolutional neural networks according to example embodiments. CNN 400 of FIG. 4A includes layers 402, 404, 406, 408, and 410, as well as kernels 412, 414, and 416. For example, at a given layer of a convolutional neural network, one or more filters or kernels can be applied to the input data of the layer. In an illustrated embodiment, layers 402, 404, and 406 are convolutional layers, kernel 412 is applied at layer 402, kernel 414 is applied at layer 404, and kernel 416 is applied at layer 406. The shape of the data and the underlying data values can be changed from input to output depending on the shape of the applied filter or kernel (e.g., 1×1, 1×2, 1×3, 1×4, and the like), the manner in which the filter or kernel is applied (e.g., mathematical application), and other parameters (e.g., stride). Kernels 412, 414, and 416 are illustrated as 1-dimensional kernels, but any other suitable shape can be implemented. In embodiments, kernels 412, 414, and 416 can have one consistent shape among them, two different shapes, or three different shapes (e.g., all the kernels are different sizes).

In some instances, the layers of a convolutional neural network can be heterogeneous and can include different mixes/sequences of convolution layers, pooling layers, fully connected layers (e.g., akin to applying a 1×1 filter), and the like. In an illustrated embodiment, layers 408 and 410 can be fully connected layers. Accordingly, CNN 400 illustrates an embodiment of a feed forward convolutional neural network with a number of convolution layers (e.g., implementing 1-dimensional filters or kernels) followed by fully connected layers. Embodiments can implement any other suitable convolutional neural networks.

CNN 420 of FIG. 4B includes layers 422, 424, 426, 428, 430, and 432, as well as kernels 434, 436, and 438. CNN 420 can be similar to CNN 400 of FIG. 4A, however layers 422, 424, and 426 can be convolutional layers with a parallel orientation, and layer 428 can be a concatenation layer that concatenates the output of layers 422, 424, and 426. For example, the input from an input layer can be fed into each of layers 422, 424, and 426, where the output from these layers is concatenated at layer 428. In some embodiments, the concatenated output from layer 428 can be fed into layer 430, which can be a fully connected layer. For example, layers 430 and 432 can each be fully connected layers, where the output from layer 432 can be the prediction generated by CNN 420.

In some embodiments, kernels 434, 436, and 438 can be similar to kernels 412, 414, and 416 of FIG. 4A. For example, kernels 434, 436, and 438 are illustrated as 1-dimensional kernels, but any other suitable shape can be implemented. In embodiments, kernels 434, 436, and 438 can have one consistent shape among them, two different shapes, or three different shapes (e.g., all the kernels are different sizes).

In some instances, the layers of a convolutional neural network can be heterogeneous and can include different mixes/sequences of convolution layers, pooling layers, fully connected layers (e.g., akin to applying a 1×1 filter), parallel layers, concatenation layers, and the like. For example, layers 422, 424, and 426 can represent three parallel layers, however a larger or smaller number of parallel layers can be implemented. Similarly, the output from each of layers 422, 424, and 426 is depicted as input to layer 428, which is a concatenation layer in some embodiments, however one or more of layers 422, 424, and 426 can include additional convolutional or other layers prior to a concatenation layer. For example, one or more convolutional or other layers can be present between layer 422 (e.g., a convolutional layer) and layer 428 (e.g., a concatenation layer). In some embodiments, another convolutional layer (with another kernel) can be implemented between layer 422 and 428 while no such intervening layer is implemented for layer 424. In other words, in this example an input to layer 422 can pass through another convolutional layer prior to being input to layer 428 (e.g., a concatenation layer) while an input to layer 424 is output directly to layer 428 (without another convolutional layer).

In some embodiments, layers 422, 424, 426, and 428 (e.g., three parallel convolutional layers and a concatenation layer) can represent a block within CNN 420, and one or more additional blocks can be implemented before or after the depicted block. For example, a block can be characterized by at least two parallel convolutional layers followed by a concatenation layer. In some embodiments, a number of additional convolutional layers (e.g., more than two) with various parallel structures can be implemented as a block. CNN 420 illustrates an embodiment of a feed forward convolutional neural network with a number of convolution layers (e.g., implementing 1-dimensional filters or kernels) with a parallel orientation followed by fully connected layers. Embodiments can implement any other suitable convolutional neural networks.

In some embodiments, the neural network can be configured for deep learning, for example based on the number of hidden layers implemented. In some examples, a Bayesian network can be similarly implemented, or other types of supervised learning models. For example, a support vector machine can be implemented, in some instances along with one or more kernels (e.g., gaussian kernel, linear kernel, and the like). In some embodiments, prediction module 306 of FIG. 3 can be multiple models stacked, for example with the output of a first model feeding into the input of a second model. Some implementations can include a number of layers of prediction models.

In some embodiments, testing instances can be given to the model to calculate its accuracy. For example, a portion of training data 308/labeled energy usage data can be reserved for testing the trained model (e.g., rather than training the model). The accuracy measurement can be used to tune prediction module 306. In some embodiments, accuracy assessment can be based on a subset of the training data/processed data. For example, a subset of the data can be used to assess the accuracy of a trained model (e.g., a 75% to 25% ratio for training to testing, and the like). In some embodiments, the data can be randomly selected for the testing and training segments over various iterations of the testing.

In some embodiments, when testing, the trained model can output a predicted data value for energy usage of the target device based on a given input (e.g., instance of testing data). For example, an instance of testing data can be energy usage data for a given source location (e.g., household) over a period of time that includes the specific energy usage of the target device over the period of time as known labeled data values. Because the energy usage data values for the target device are known for the given input/testing instance, the predicted value can be compared to the known value to generate an accuracy metric. Based on testing the trained model using multiple instances of testing data, an accuracy for the trained model can be assessed.

In some embodiments, the design of prediction module 306 can be tuned based on accuracy calculations during training, retraining, and/or updated training. For example, tuning can include adjusting a number of hidden layers in a neural network, adjusting a kernel calculation (e.g., used to implement a support vector machine or neural network), and the like. This tuning can also include adjusting/selecting features used by the machine learning model, adjustments to the processing of input data, and the like. Embodiments include implementing various tuning configurations (e.g., different versions of the machine learning model and features) while training/calculating accuracy in order to arrive at a configuration for prediction module 306 that, when trained, achieves desired performance (e.g., performs predictions at a desired level of accuracy, runs according to desired resource utilization/time metrics, and the like). In some embodiments, the trained model can be saved or stored for further use and for preserving its state. For example, the training of prediction module 306 can be performed "offline" and the trained model can then be stored and used as needed to achieve time and resource efficient data prediction.

Embodiments of prediction module 306 are trained to disaggregate energy usage data within an overall source location (e.g., household) energy usage data. NILM and/or disaggregation refers to taking as input total energy usage at a source location (e.g., energy usage at a household provided by advanced metering infrastructure) and estimating energy usage for one or more appliances, electric vehicles, and other devices that use energy at the source location. FIGS. 5A-5G illustrate sample graphs that depict disaggregated energy usage data according to an example embodiment. The data depicted in the sample graphs represents tested embodiments of the disaggregation techniques disclosed herein, for example a trained machine learning model disaggregating energy usage at an unseen source location (e.g., home).

Figure 5A:
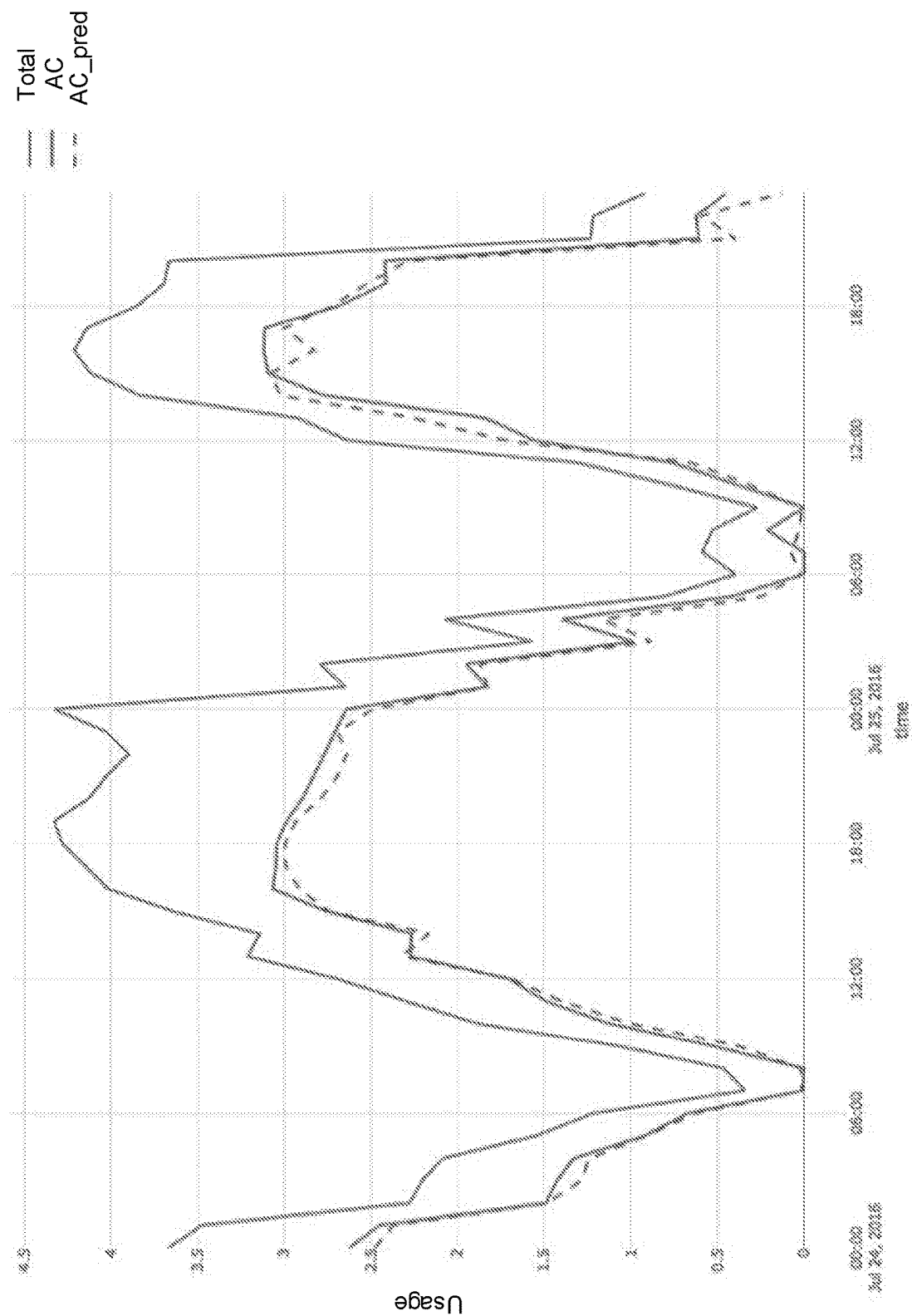

FIG. 5A depicts a graphical representation of total energy usage data, labeled energy usage data for a target device, namely an air conditioner, and predicted energy usage data for the target device (e.g., predicted by a trained embodiment of prediction module 306). In the graph, time is represented on the x-axis while energy usage (in kWh) is represented on the y-axis. The depicted data includes an hourly granularity for the measured data (e.g., total energy usage data and labeled energy usage data for the target device). Any other suitable granularity can similarly be implemented.

With reference to FIG. 5A, a comparison of the labeled energy usage data values for the target device (actual/measured data values) versus the predicted energy usage data values for the target device demonstrates the accuracy of the trained prediction model. For example, the trained prediction model can receive (as input) the total energy usage data values (or a processed version) and generate the graphically represented predictions. In some embodiments, the total energy usage data values can include energy usage by the target device and by a plurality of other devices. As depicted in FIG. 5A, the predicted disaggregated energy usage values for the target device achieve a high degree of accuracy over multiple days. Any other suitable data granularities, periods of time, or other suitable parameters can be implemented.

Figure 5B:
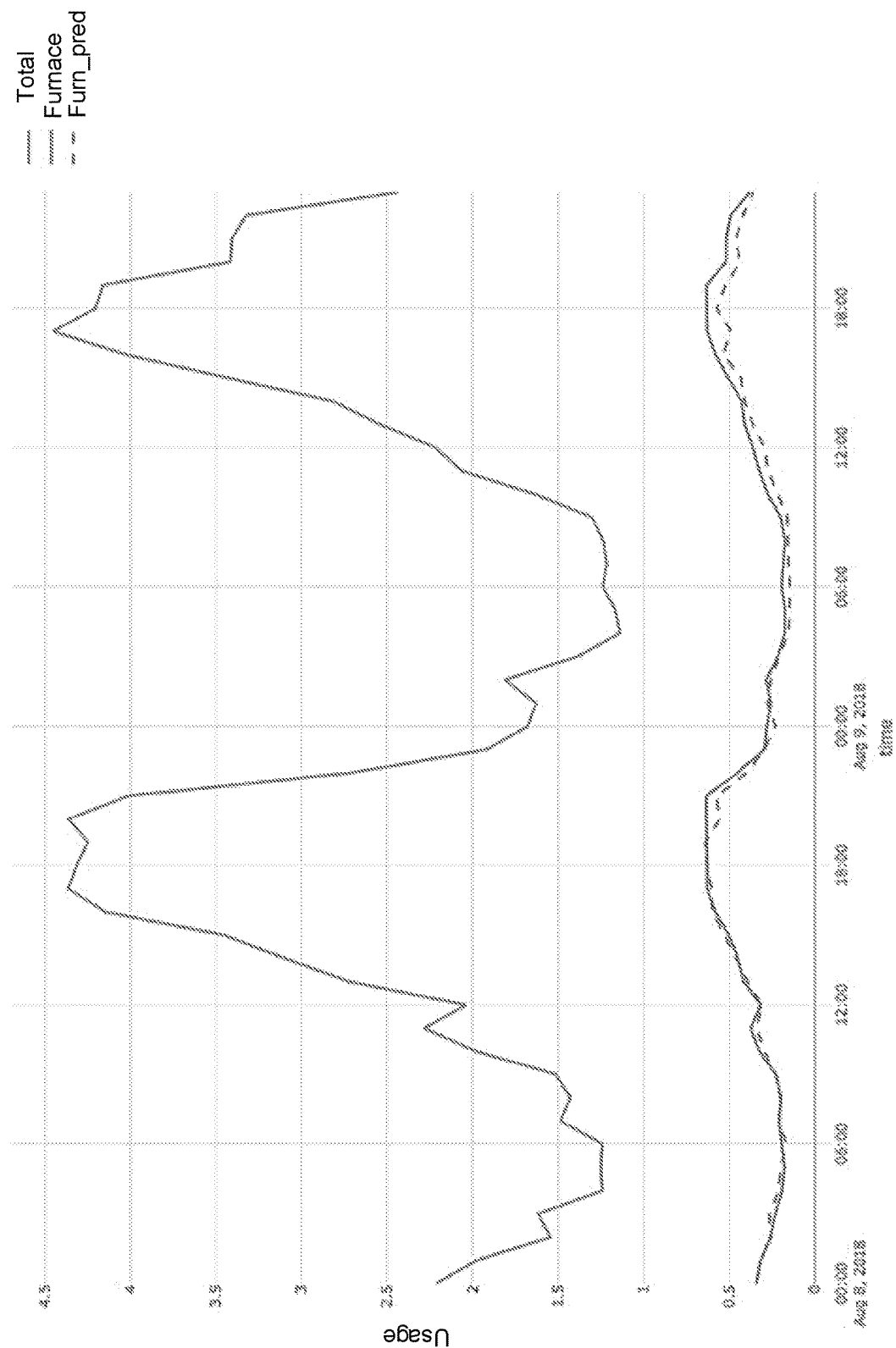
Figure 5C:
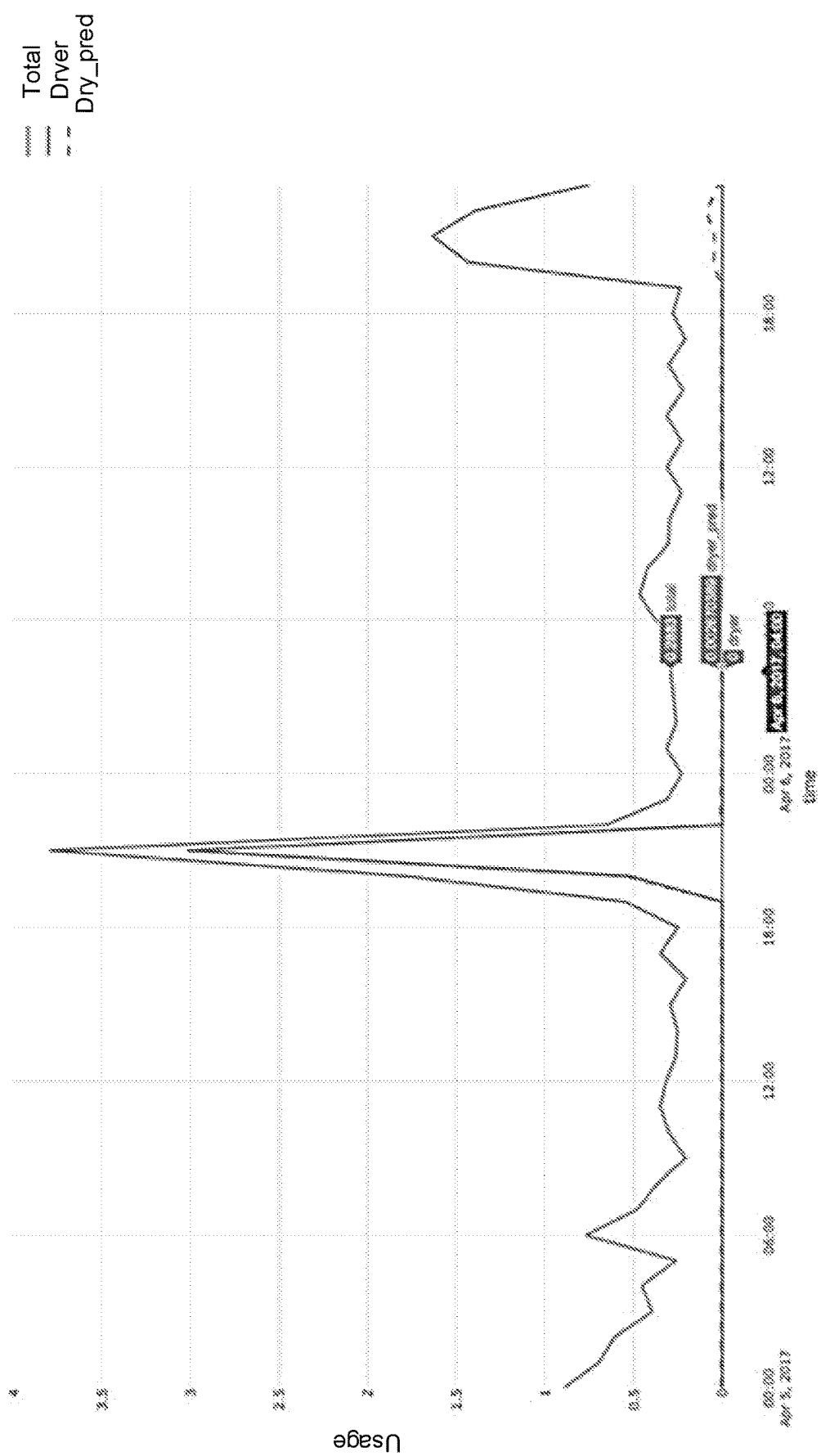
Figure 5D:
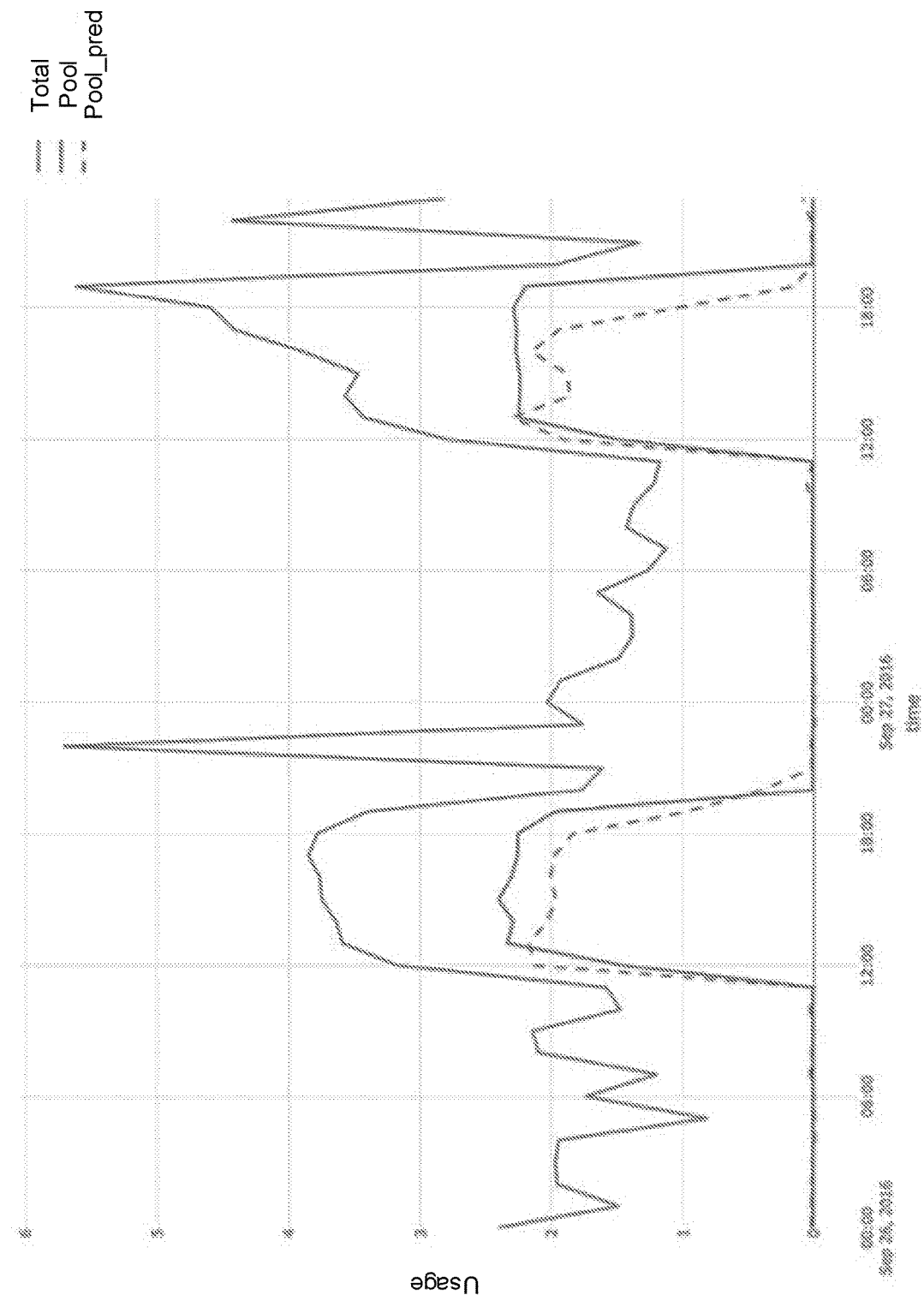
Figure 5E:
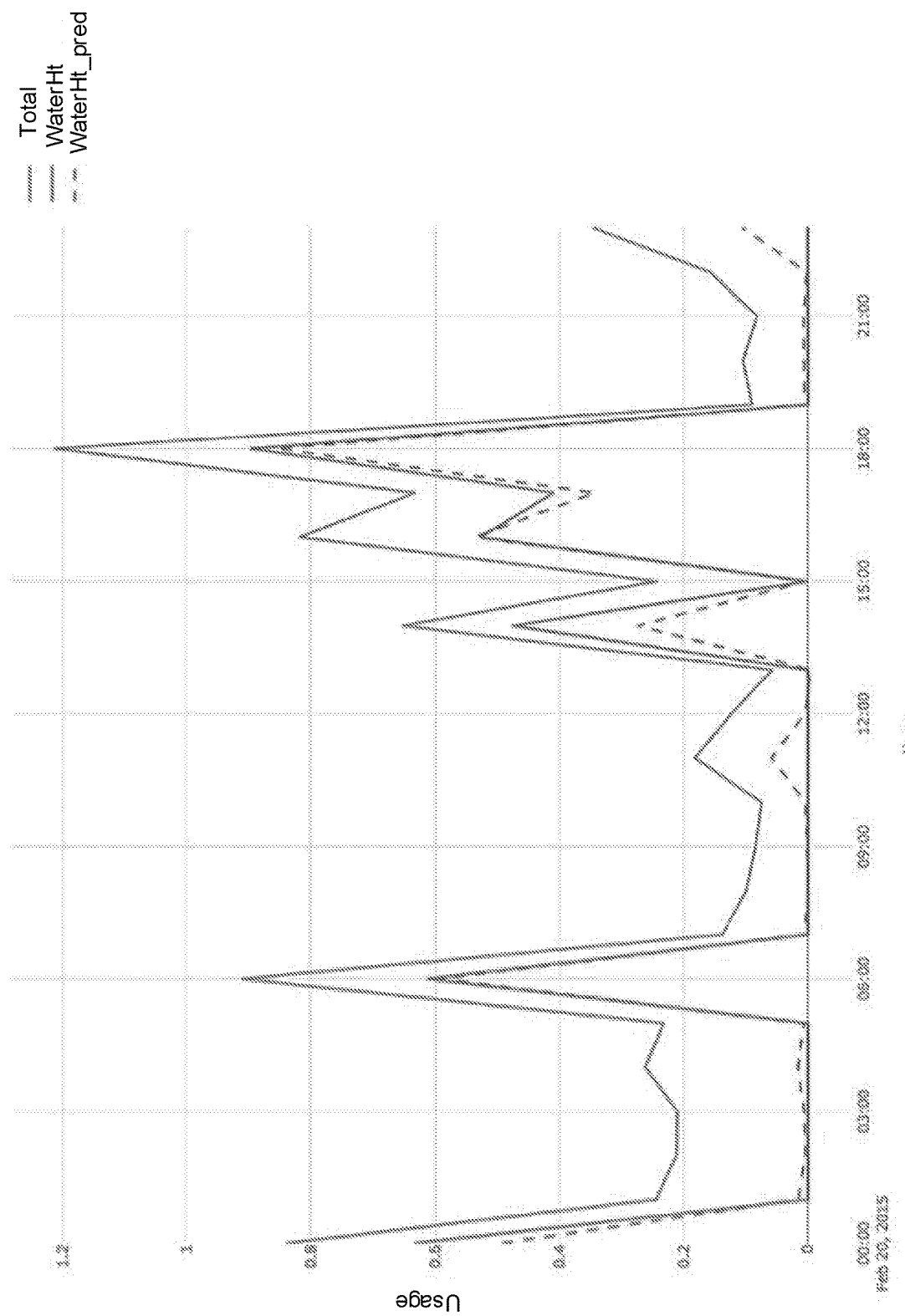
Figure 5G:
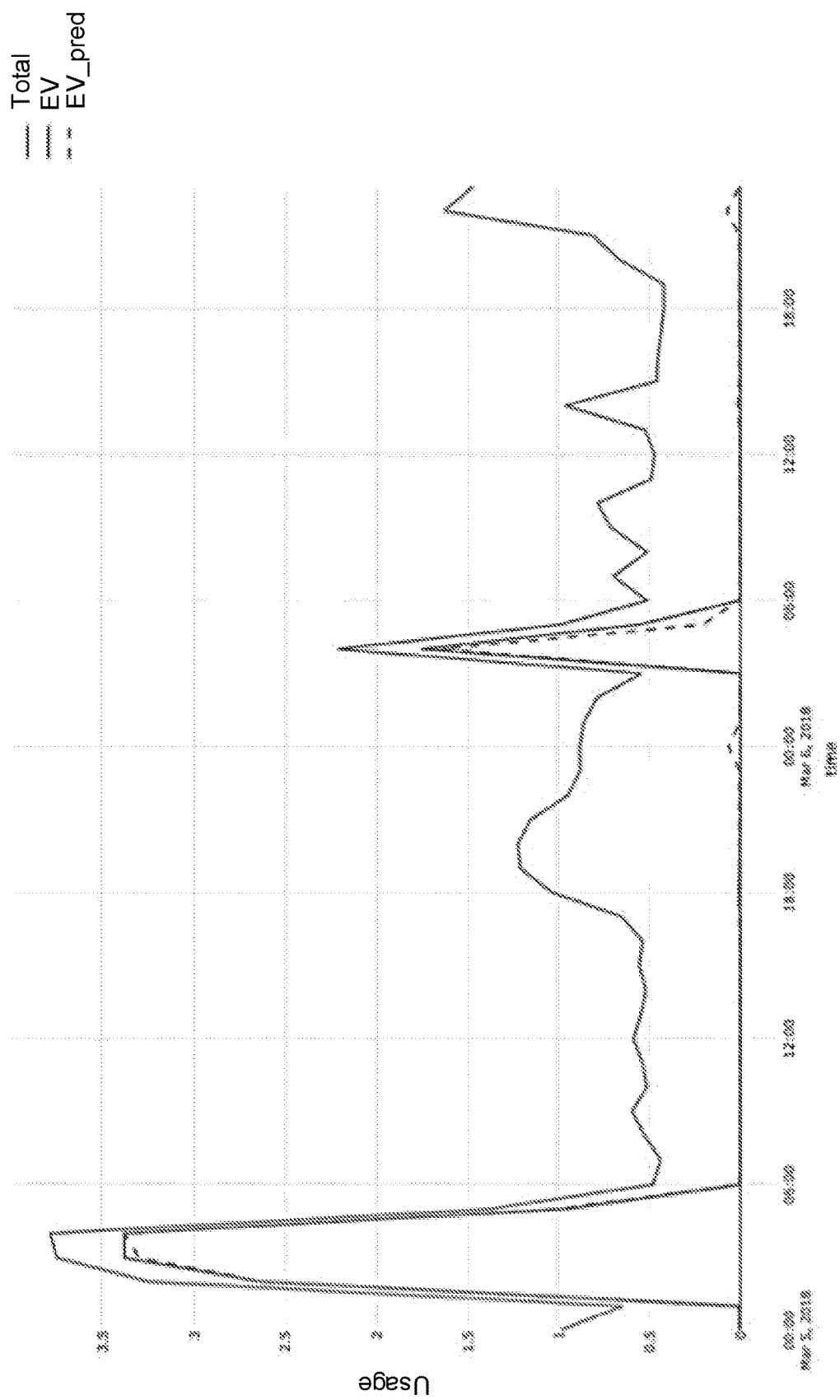

FIGS. 5B-5G depict a number of graphical representations of total energy usage data, labeled energy usage data for target devices, and predicted energy usage data for the target devices. For example, the graphs of FIGS. 5B-5G can be similar to the graph of FIG. 5A with differing target devices. The graph of FIG. 5B depicts predicted disaggregation for a furnace target device (e.g., electric furnace). The graph of FIG. 5C depicts predicted disaggregation for a dryer target device (e.g., electrical appliance). The graph of FIG. 5D depicts predicted disaggregation for a pool pump target device. The graph of FIG. 5E depicts predicted disaggregation for a water heater target device. The graph of FIG. 5F depicts predicted disaggregation for a refrigerator target device. The graph of FIG. 5G depicts predicted disaggregation for an electric vehicle target device. The predictions depicted in the graphs of FIGS. 5A-5G can utilize source location energy usage from a household that includes a number of appliances/devices that consume energy in addition to the relevant target device. The input used to generate the predicted disaggregation (e.g., input to learning module 306) can include energy usage data that has not been used in training. In other words, the trained learning module 306 generates a prediction for input data that was previously unseen.

In some embodiments, input 302 and/or training data 308 can include information other than energy usage information. For example, weather information relative to the energy usage data (e.g., the weather at the time the energy usage was measured, such as precipitation, temperature, and the like), calendar information relative to the energy usage data (e.g., calendar information at the time the energy usage was measured, such as month, date, day of week, and the like), a time stamp relative to the energy usage data, and other relevant information can be included in input 302 and/or training data 308.

Embodiments process energy usage data from a source location (e.g., household) to generate the training data 308 that is used to train prediction module 306. For example, the overall source location energy usage data values depicted in FIGS. 5A-5G can be combined with labeled energy usage data values for one or more devices, and this resultant combination can be processed to arrive at training data 308. In some embodiments, the energy usage data for a source location can be obtained via measurement (e.g., metering). In addition, measurement, metering, or some other technique for receiving/monitoring energy usage for specific devices within the source location can be implemented to generate the device specific labeled energy usage data for training. In other examples, energy usage data that includes source location energy usage and disaggregated device specific energy within the source location can be obtained from a third party. For example, training data can be obtained in any suitable manner, such as by monitoring source locations (e.g., households) in known circumstances, obtaining data sets publicly (or otherwise) available, developing a joint venture or partnership that results in the training data, and through any other suitable means.

An example of energy usage data that can be processed to generate training data 308 includes:

TABLE 1

Pre-processed Source Location Energy Usage Data

| Id | Time | Total | AC | EV | Washer | Dryer | Dishwasher | Refrigerator | ... |
|---|---|---|---|---|---|---|---|---|---|
| 1 | 2019-06-01 00:00:00 | 0.91 | 0.33 | 0.0 | null | null | null | 0.02 | |
| 1 | 2019-06-01 00:00:15 | 3.52 | 0.41 | 2.91 | null | null | null | 0.06 | |
| 1 | 2019-06-01 00:00:30 | 3.95 | 0.0 | 3.33 | null | null | null | 0.11 | |
| 1 | 2019-06-01 00:00:45 | 3.26 | 0.0 | 2.83 | null | null | null | 0.11 | |
| 1 | 2019-06-01 01:00:00 | 0.86 | 0.0 | 0.58 | null | null | null | 0.14 | |
| 1 | 2019-06-01 01:00:15 | 0.55 | 0.0 | 0.0 | null | null | null | 0.18 | |
| 1 | 2019-06-01 01:00:30 | 0.67 | 0.0 | 0.0 | null | null | null | 0.09 | |
| 1 | 2019-06-01 01:00:45 | 0.52 | 0.0 | 0.0 | null | null | null | 0.04 | |
| 9 | 2019-06-01 02:00:00 | 0.44 | 0.0 | 0.0 | null | null | null | 0.02 | |
| 10 | 2019-06-01 02:00:15 | 0.63 | 0.0 | 0.0 | null | null | null | 0.03 | |
| 11 | 2019-06-01 02:00:30 | 0.72 | 0.0 | 0.0 | null | null | null | 0.01 | |

A sample row of this example data includes the columns: identifier, timestamp, total (energy usage), and labeled device specific energy usage (air conditioner, electric vehicle, washer, dryer, dish washer, refrigerator, and the like). This example includes a granularity of 15 minutes, but other suitable granularities can similarly be implemented (e.g., 1 min, 5 mins, 15 mins, 30 mins, 1 hour, hours, and the like). In some embodiments, processing the energy usage data (e.g., to generate training data 308) can include reducing a granularity of the data, for example so that it can be used to generate a training corpus with a consistent granularity (e.g., 1 hour). Such granularity reduction can be achieved by summing the data usage values over the components that make up a unit of time (e.g., summing the data usage values over the 4 15-minute intervals that make up an hour).

Embodiments include a determined set of devices to be included within training data 308. For example, the training of prediction module 306 can be configured to generate disaggregation predictions for a target device, however the training can utilize labeled data usage for a set of other devices in addition to the target device. In some embodiments, the set of other devices can be based on the energy usage data and/or device specific labeled data values available for training purposes. Training data is often limited, and therefore training techniques that leverage the available training data are often beneficial.

Embodiments include a correspondence between the set of other devices used within the techniques for training the machine learning model and the labeled device specific energy usage data values available in the training data. In other words, the labeled device specific energy usage data values available in the training data can include labels for a number of different devices, there may be many different combinations of devices that appear within a given source location of the training data, and the frequency with which different devices appear together at the same source location can vary. The set of other devices used within the training techniques can be based on the device diversity within the training data, the different combinations of devices at given source locations, and/or the frequency of appearance for different combinations of devices.

Accordingly, a number of different variants of training data 308 can be generated by processing the pre-processed energy usage data from Table 1 above. Table 2 represents an example of processing the energy usage data to generate training data 308 that includes the time stamp, total source location energy usage, and labeled energy usage for a single target device, an electric vehicle.

TABLE 2

Pre-processed Data for the Target Device Electric Vehicle (EV), and no Additional Input Devices

| Time | Total | EV |
|---|---|---|
| 2019-06-01 00:00:00 | 0.91 | 0.0 |
| 2019-06-01 00:00:15 | 3.52 | 2.91 |
| 2019-06-01 00:00:30 | 3.95 | 3.33 |
| 2019-06-01 00:00:45 | 3.26 | 2.83 |
| 2019-06-01 01:00:00 | 0.86 | 0.58 |
| 2019-06-01 01:00:15 | 0.55 | 0.0 |
| 2019-06-01 01:00:30 | 0.67 | 0.0 |
| 2019-06-01 01:00:45 | 0.52 | 0.0 |
| 2019-06-01 02:00:00 | 0.44 | 0.0 |
| 2019-06-01 02:00:15 | 0.63 | 0.0 |
| 2019-06-01 02:00:30 | 0.72 | 0.0 |

In some embodiments, pre-processing can include selecting, from Table 1, a subset of columns, a subset of rows, an aggregation (or some other mathematical/combinatorial function) of data, and other suitable processing. For example, data cleaning, normalization, scaling, or other processing used to render the data suitable for machine learning can be performed.

Table 3 represents an example of processing the energy usage data to generate training data 308 that includes the time stamp, total source location energy usage, labeled energy usage for a target device (an electric vehicle), and labeled energy usage for an additional device (an air conditioner).

TABLE 3

Pre-processed Data for the Target Device
EV and 1 Additional Input Device AC

| Time | Total | AC | EV |
|---|---|---|---|
| 2019-06-01 00:00:00 | 0.91 | 0.33 | 0.0 |
| 2019-06-01 00:00:15 | 3.52 | 0.41 | 2.91 |
| 2019-06-01 00:00:30 | 3.95 | 0.0 | 3.33 |
| 2019-06-01 00:00:45 | 3.26 | 0.0 | 2.83 |
| 2019-06-01 01:00:00 | 0.86 | 0.0 | 0.58 |
| 2019-06-01 01:00:15 | 0.55 | 0.0 | 0.0 |
| 2019-06-01 01:00:30 | 0.67 | 0.0 | 0.0 |
| 2019-06-01 01:00:45 | 0.52 | 0.0 | 0.0 |
| 2019-06-01 02:00:00 | 0.44 | 0.0 | 0.0 |
| 2019-06-01 02:00:15 | 0.63 | 0.0 | 0.0 |
| 2019-06-01 02:00:30 | 0.72 | 0.0 | 0.0 |

Table 4 represents an example of processing the energy usage data to generate training data 308 that includes the time stamp, total source location energy usage, labeled energy usage for a target device (an electric vehicle), and labeled energy usage for three additional devices (an air conditioner, washer, and dryer).

TABLE 4

Pre-processed Data for the Target Device EV and
3 Additional Input Devices: AC, Washer, and Dryer

| Time | Total | AC | EV | Washer | Dryer |
|---|---|---|---|---|---|
| 2019-06-01 00:00:00 | 0.91 | 0.33 | 0.0 | 0.0 | 0.0 |
| 2019-06-01 00:00:15 | 3.52 | 0.41 | 2.91 | 0.0 | 0.0 |
| 2019-06-01 00:00:30 | 3.95 | 0.0 | 3.33 | 0.0 | 0.0 |
| 2019-06-01 00:00:45 | 3.26 | 0.0 | 2.83 | 0.0 | 0.0 |
| 2019-06-01 01:00:00 | 0.86 | 0.0 | 0.58 | 0.0 | 0.0 |
| 2019-06-01 01:00:15 | 0.55 | 0.0 | 0.0 | 0.0 | 0.0 |
| 2019-06-01 01:00:30 | 0.67 | 0.0 | 0.0 | 0.0 | 0.0 |
| 2019-06-01 01:00:45 | 0.52 | 0.0 | 0.0 | 0.0 | 0.0 |
| 2019-06-01 02:00:00 | 0.44 | 0.0 | 0.0 | 0.0 | 0.0 |
| 2019-06-01 02:00:15 | 0.63 | 0.0 | 0.0 | 0.0 | 0.0 |
| 2019-06-01 02:00:30 | 0.72 | 0.0 | 0.0 | 0.0 | 0.0 |

In this illustrated example, devices with null values in Table 1 are included in Table 4, however the null values have been replaced with zero values. The null values present in Table 1 for the washer and dryer indicate that the source location energy usage data from Table 1 does not include labeled washer and dryer energy usage data. In other words, labeled energy usage data for the washer and dryer within the overall source location energy usage data (represented in Table 1) is not available, for instance due to limitations with the training corpus, measuring/metering devices, or other circumstances.

In some embodiments, processing device specific labeled energy usage data for a source location can include replacing null values (or any other place holder value) with zero values. For example, when it is determined that a particular device is to be used in the training techniques for a given implementation of prediction module 306 and that portions of the energy usage data lack labeled device specific energy usage for the particular device (at one or more source locations), the labeled energy usage values for the particular device that are missing can be replaced with zero values. As further discussed herein, it can be determined that certain devices will participate in the training techniques for a given implementation even when the training corpus does not include a comprehensive set of labeled energy usage data for these devices. Embodiments replace null values with zero values in order to utilize available training data, leverage one or more devices other than the target device for learning purposes, and generally improve machine learning performance.

Table 5 represents an example of processing the energy usage data to generate training data 308 that includes the time stamp, total source location energy usage, labeled energy usage for a target device (an electric vehicle), and labeled energy usage for four additional devices (an air conditioner, washer, dryer, and refrigerator).

TABLE 5

Pre-processed Data for the Target Device EV and 4 Additional
Input Devices: AC, Washer, Dryer, and Refrigerator

| Time | Total | AC | EV | Washer | Dryer | Refrigerator |
|---|---|---|---|---|---|---|
| 2019-06-01 00:00:00 | 0.91 | 0.33 | 0.0 | 0.0 | 0.0 | 0.02 |
| 2019-06-01 00:00:15 | 3.52 | 0.41 | 2.91 | 0.0 | 0.0 | 0.06 |
| 2019-06-01 00:00:30 | 3.95 | 0.0 | 3.33 | 0.0 | 0.0 | 0.11 |
| 2019-06-01 00:00:45 | 3.26 | 0.0 | 2.83 | 0.0 | 0.0 | 0.11 |
| 2019-06-01 01:00:00 | 0.86 | 0.0 | 0.58 | 0.0 | 0.0 | 0.14 |
| 2019-06-01 01:00:15 | 0.55 | 0.0 | 0.0 | 0.0 | 0.0 | 0.18 |
| 2019-06-01 01:00:30 | 0.67 | 0.0 | 0.0 | 0.0 | 0.0 | 0.09 |
| 2019-06-01 01:00:45 | 0.52 | 0.0 | 0.0 | 0.0 | 0.0 | 0.04 |
| 2019-06-01 02:00:00 | 0.44 | 0.0 | 0.0 | 0.0 | 0.0 | 0.02 |
| 2019-06-01 02:00:15 | 0.63 | 0.0 | 0.0 | 0.0 | 0.0 | 0.03 |
| 2019-06-01 02:00:30 | 0.72 | 0.0 | 0.0 | 0.0 | 0.0 | 0.01 |

In the example illustrated for a source location in Table 5, the target device is accompanied by two devices with labeled energy usage data (e.g., air conditioner and refrigerator) and two devices that do not include labeled energy usage data (e.g., washer and dryer), where the two devices without labeled energy usage data have been processed to reflect zero energy usage data labels. Table 6 represents an example of processing the energy usage data to generate training data 308 that includes the time stamp, total source location energy usage, labeled energy usage for a target device (an electric vehicle), and labeled energy usage for five additional devices (an air conditioner, washer, dryer, dishwasher, and refrigerator).

TABLE 6

Pre-processed Data for the Target Device EV and 5 Additional Input
Devices: AC, Washer, Dryer, Dishwasher, and Refrigerator

| Time | Total | AC | EV | Washer | Dryer | Dishwasher | Refrigerator |
|---|---|---|---|---|---|---|---|
| 2019-06-01 00:00:00 | 0.91 | 0.33 | 0.0 | 0.0 | 0.0 | 0.0 | 0.02 |
| 2019-06-01 00:00:15 | 3.52 | 0.41 | 2.91 | 0.0 | 0.0 | 0.0 | 0.06 |
| 2019-06-01 00:00:30 | 3.95 | 0.0 | 3.33 | 0.0 | 0.0 | 0.0 | 0.11 |
| 2019-06-01 00:00:45 | 3.26 | 0.0 | 2.83 | 0.0 | 0.0 | 0.0 | 0.11 |
| 2019-06-01 01:00:00 | 0.86 | 0.0 | 0.58 | 0.0 | 0.0 | 0.0 | 0.14 |
| 2019-06-01 01:00:15 | 0.55 | 0.0 | 0.0 | 0.0 | 0.0 | 0.0 | 0.18 |

TABLE 6-continued

Pre-processed Data for the Target Device EV and 5 Additional Input
Devices: AC, Washer, Dryer, Dishwasher, and Refrigerator

| Time | Total | AC | EV | Washer | Dryer | Dishwasher | Refrigerator |
|---|---|---|---|---|---|---|---|
| 2019-06-01 01:00:30 | 0.67 | 0.0 | 0.0 | 0.0 | 0.0 | 0.0 | 0.09 |
| 2019-06-01 01:00:45 | 0.52 | 0.0 | 0.0 | 0.0 | 0.0 | 0.0 | 0.04 |
| 2019-06-01 02:00:00 | 0.44 | 0.0 | 0.0 | 0.0 | 0.0 | 0.0 | 0.02 |
| 2019-06-01 02:00:15 | 0.63 | 0.0 | 0.0 | 0.0 | 0.0 | 0.0 | 0.03 |
| 2019-06-01 02:00:30 | 0.72 | 0.0 | 0.0 | 0.0 | 0.0 | 0.0 | 0.01 |

In the example illustrated for a source location in Table 6, the target device is accompanied by two devices with labeled energy usage data (e.g., air conditioner and refrigerator) and three devices that do not include labeled energy usage data (e.g., dishwasher, washer, and dryer), where the three devices without labeled energy usage data have been processed to reflect zero energy usage data labels. As demonstrated by Tables 2-6, processing energy usage data for a given source location that includes labeled energy usage data for some devices can generate different variants of training data. Embodiments can utilize one or more of the variants to train machine learning models and achieve a beneficial result.

For example, a given implementation for training module 306 may involve several factors. An implementation may aim to disaggregate energy usage for a single target device, however several other factors related to the available training data can be at issue, such as the availability of overall energy usage data that includes labeled energy usage data for the target device at different source locations, the number and diversity of other devices with available labeled energy usage data that are collocated with the target device at different source locations, the granularity of the energy usage data available, and other relevant factors. Accordingly, an implementation that achieves desired prediction results may involve the use of labeled energy usage data for the target device, labeled energy usage data for a set of other devices, and energy usage data set to zero for certain ones of the set of other devices in portions of the training data. As such, the particular variant of the processed training data represented in Tables 2-6 that achieves desired results is based on the available training data and its relevant factors. In other words, a set of devices to be utilized within the training data can be determined, such as based on available energy usage data with labeled device specific energy usage values.

In some embodiments, the set of other devices that will participate in training can meet certain criteria relative to the available training data. For example, the available training data can include energy usage values for a number of source locations (e.g., households), and the energy usage for a majority of the source locations can include labeled energy usage from the target device and labeled energy usage from at least one of the set of other devices. In another example, the set of other devices may be determined such that at least a threshold number (e.g., minimum number) of other devices are used within the training techniques. In some embodiments, the set of other devices may be determined such that any given instance of training data (e.g., a row of training data) includes no more than a threshold number of other devices whose energy usage data values are set to zero (e.g., no more than 0, 1, 2, 3, and the like). In some embodiments, the set of other devices can be determined to be a null set, for instance based on limitations presented by the training data.

In some embodiments, the set of other devices is determined such that an amount of training data used to train the machine learning model based on the set of other devices meets a criteria. For example, the set of other devices may be determined such that at least a threshold number (e.g., minimum number) of training instances (e.g., rows of training data) are useful for training. In another example, the set of other devices may be determined such that the amount of labeled device specific energy usage data values set to zero meets a criteria (e.g., is below a threshold percentage of the training data, such as 5%, 10%, 15%, 20%, 30%, 40%, 50%, and the like).

Embodiments can also include training and implementation techniques that achieve other correspondence between the training data and the set of other devices. For example, a majority of instances of training data (e.g., rows of training data) can include added zero labeled energy usage values (based on the set of other devices not being present at a household or in a data set). In another example, a majority of instances of training data can include non-zero labeled energy usage values for the target device. In another example, a majority of instances of training data can include non-zero labeled energy usage values for the target device and at least one of the set of other devices. In another example, at least some instances of training data can include added zero labeled energy usage values for the target device. In another example, each of the set of other devices can have non-zero labeled energy usage values in at least a threshold amount (e.g., 10%, 20%, 30%, and the like) of instances of training data. In another example, one or more instances of training data can include non-zero labeled energy usage values for the target device and at least two of the set of other devices. The training techniques and set of other devices can be implemented to achieve any, most, one, or a combination of these correspondences, or can achieve any other suitable correspondence.

In some embodiments, when training data for the set of other devices is used in combination with training data for the target device, the training techniques (e.g., prediction generation, loss calculation, gradient propagation, accuracy improvements, and the like) can be implemented using the target device and the set of other devices. For example, the post-processed training data can be used to train a machine learning model to predict energy usage for a target device from within source location (e.g., household) energy usage. In some embodiments, input data, such as source location energy usage data over a period of time, can be received, processed, and fed into the trained machine learning model to generate predictions about how much of the energy used at the source location was used by the target device.

In some embodiments, when a determined set of other devices is used to train a machine learning model, the predictions generated by the trained model can include disaggregation predictions for the target device and predictions generated for the set of other devices (e.g., non-target devices). For example, the predictions generated for the non-target devices can be useful when calculating accuracy metrics and training the model (e.g., based on labeled device specific energy usage for the set of other devices). In some embodiments that focus of disaggregation predictions for the target device, the generated predictions for the set of other devices can be discarded. For example, these embodiments utilize the benefits of training using the other devices, and these benefits improve the disaggregation prediction for the target device.

In some embodiments, versions of the processed training data can be used to train a convolutional neural network to disaggregate target device energy usage. With reference to FIG. 4A, CNN 400 includes layers 402, 404, and 406, which can be convolutional layers, and layers 408 and 410, which can be fully connected layers. Kernel 412, shown as having a 1× a shape, can be applied at layer 402, kernel 414, shown as having a 1×b shape, can be applied at layer 404, and kernel 416, shown as having a 1×c shape, can be applied at layer 406. In some embodiments, the shapes of kernels 412, 414, and 416 can be tuned during training/configuring of CNN 400, and thus these can take any suitable shape that achieves effective performance of the disaggregation task.

Similarly, with reference to FIG. 4B, CNN 420 includes layers 422, 424, and 426, which can be convolutional layers, layer 428, which can be a concatenation layer, and layers 430 and 432, which can be fully connected layers. Kernel 434, shown as having a 1× a shape, can be applied at layer 422, kernel 436, shown as having a 1×b shape, can be applied at layer 434, and kernel 438, shown as having a 1×c shape, can be applied at layer 426. In some embodiments, the shapes of kernels 434, 436, and 438 can be tuned during training/configuring of CNN 420, and thus these can take any suitable shape that achieves effective performance of the disaggregation task.

In some embodiments, the shape of kernels 412, 414, and 416 can change the shape of the data as it progresses through layers 402, 404, and 406, respectively. For example, when input data progresses through layers 402, 404, and 406, the application of kernels 412, 414, and 416 can change the shape of the input data. In some embodiments, the shape of the data progressing through layers 402, 404, and 406 is based on the shape of kernels 412, 414, and 416, the stride for each kernel, and an implemented padding. For example, padding can include adding 0's to the data (e.g., to the top, bottom, left, and/or right of the data). In some embodiments, for one or more of layers 412, 414, and 416, the combination of kernel shape, stride, and padding can result in same/original size convolutions that do not change the shape of the data.

Similarly, the shape of kernels 434, 436, and 438 can change the shape of the data as it progresses through layers 422, 424, and 426, respectively. For example, when input data progresses through layers 422, 424, and 426, the application of kernels 434, 436, and 438 can change the shape of the input data. In some embodiments, the shape of the data progressing through layers 422, 424, and 426 is based on the shape of kernels 434, 436, and 438, the stride for each kernel, and an implemented padding. In some embodiments, for one or more of layers 434, 436, and 438, the combination of kernel shape, stride, and padding can result in same/original size convolutions that do not change the shape of the data.

As discussed above, embodiments predict energy usage disaggregation for a target device, however a set of other devices (e.g., non-target devices) can also participate in the learning techniques (e.g., prediction, loss calculation, gradient propagation). Embodiments that implement a CNN can use the training data, loss calculation, and gradient propagation for non-target devices to configure weights/values for the kernels implemented at the different layers. This training/configuration of the CNN results in neurons trained based on non-target devices that can be effective in improving the accuracy of predictions for the target device.

Figure 6:
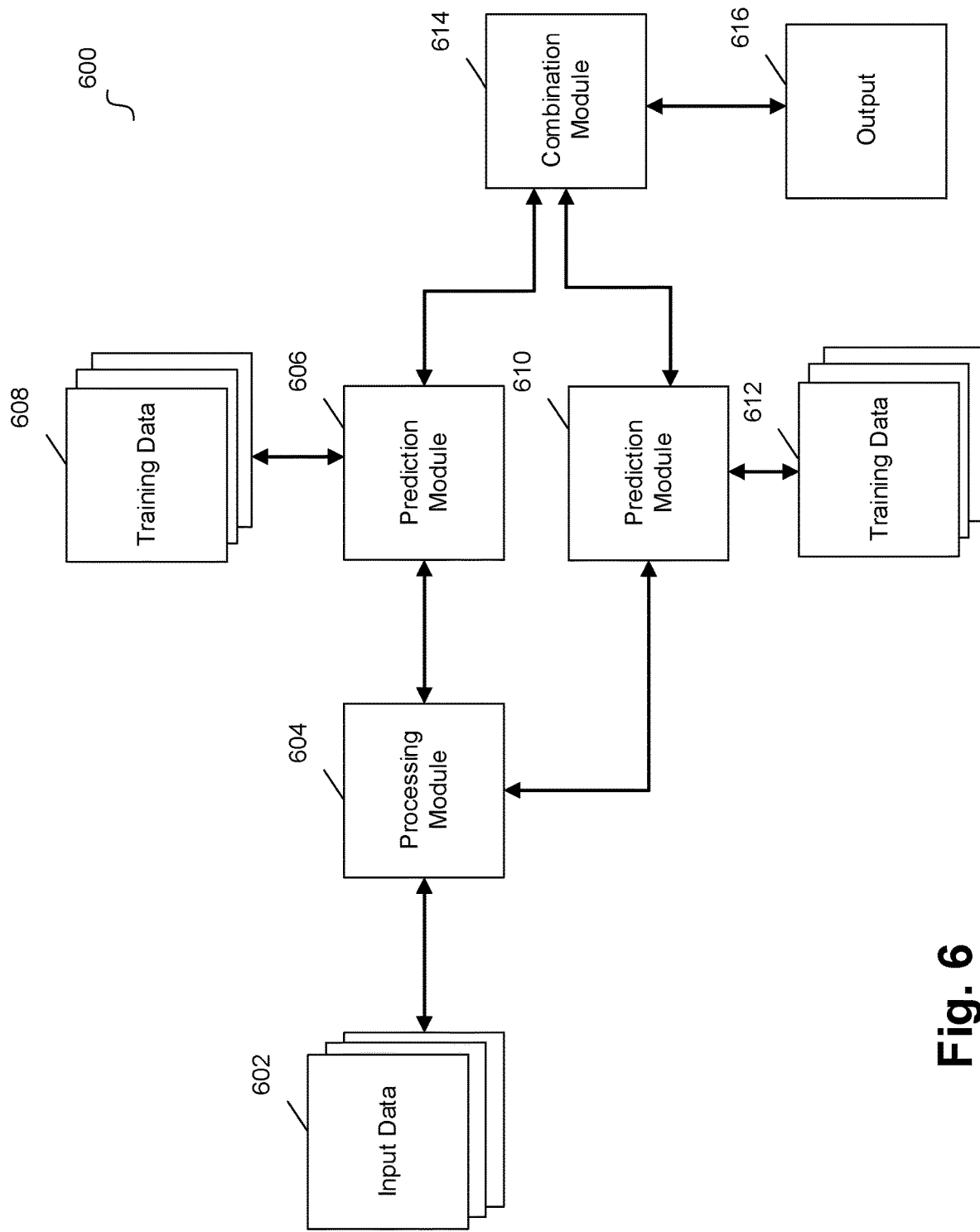
FIG. 6 illustrates a flow diagram for using multiple machine learning models to disaggregate energy usage associated with a target device according to an example embodiment.

In some embodiments, multiple machine learning models can be trained, and the outputs of these models can be combined to achieve a predicted energy usage disaggregation for the target device. FIG. 6 illustrates a flow diagram for using multiple machine learning models to disaggregate energy usage associated with a target device according to an example embodiment.

System 600 includes input data 602, processing module 604, prediction modules 606 and 610, training data 608 and 612, combination module 614, and output 616. In some embodiments, input data 602 can include energy usage from a source location, and the data can be processed by processing module 604. For example, processing module 604 can process input data 602 to generate features based on the input data. In some embodiments, input data 602 and processing module 604 can be similar to input data 302 and processing module 304 of FIG. 3

In some embodiments, prediction modules 606 and 610 can be machine learning modules (e.g., neural networks) that are trained by training data 608 and 612, respectively. For example, training data 608 can include labeled data, such as energy usage data values from a plurality of source locations (e.g., source locations 102 and 106 from FIG. 1) that include labeled device specific energy usage data values. In some embodiments, the output from processing module 604, such as the processed input, can be fed as input to prediction modules 606 and 610. In some embodiments, predictions modules 606 and 610 can be similar to prediction module 306 of FIG. 3.

In some embodiments, training data 608 can train prediction module 606 to predict disaggregated energy usage for a target device while training data 612 can train prediction module 610 to predict energy usage for the target device above a threshold. For example, training data 608, which trains prediction module 606 to generate disaggregation predictions, can include labeled energy usage data with an amount of energy used (e.g., over a timespan). In other words, the labeled device specific energy usage data of training data 608 reflect an amount of energy used, such as those represented in Tables 1-6 above.

In some embodiments, training data 612, which trains prediction module 610 to generate detection predictions, can include detected energy usage (e.g., over a timespan). In other words, the labeled device specific energy data within training data 612 can represent whether energy beyond a threshold was used (e.g., a binary value that represents ON or OFF). In some embodiments, training data 612 can be generated by setting any labeled device specific energy usage value above the threshold value to 1 and any labeled device specific energy usage value below the threshold value to 0. For example, the labeled device specific energy usage of training data 612 may not include an amount of energy usage for the labeled devices (e.g., and instead includes a binary 1 or 0).

Prediction module 606 can generate predicted disaggregated energy usage for the target device based on input data 602 and prediction module 610 can generate target device detection predictions based on input data 602. These predictions from prediction modules 606 and 610 can be input to combination module 614, which can generate a combined disaggregation prediction for the target device as output 616. In some embodiments, combination module 614 combines the disaggregation prediction from prediction module 606 and the detection prediction from prediction module 610 by adding value to the predicted disaggregation for the target device based on the detection prediction, such as when the detection prediction is inconsistent with the disaggregation prediction.

For example, in an instance where the prediction module 606 generates little or no predicted energy usage for the target device for a given period of time (e.g., an hour of time) and prediction module 610 generates a prediction that the target device was using energy at this period of time (e.g., a 1 prediction that indicates the target device was on and using energy), combination module 614 can augment the disaggregation prediction by adding energy usage value (e.g., a threshold or predetermined amount of energy usage value) to the predicted disaggregation for the period of time. Similarly, in an instance where the prediction module 606 generates substantial predicted energy usage value (e.g., energy usage value above a threshold) for the target device for a given period of time (e.g., an hour of time) and prediction module 610 generates a prediction that the target device was not using energy at this period of time (e.g., a 0 prediction that indicates the target device was off and not using energy), combination module 614 can augment the disaggregation prediction by subtracting energy usage value (e.g., a threshold or predetermined amount of energy usage value) from the predicted disaggregation for the period of time.

In some embodiments, combination module 614 can combine the disaggregation prediction from prediction module 606 and the detection prediction from prediction module 610 using a weighting algorithm. For example, prediction module 610 can generate a detection prediction for the time of use (e.g., by indicating ON/OFF) of the target device, such as at a 1-minute, 5-minute, 15-minute, 30-minute, 45-minute, 1-hour, or other similar granularity. Prediction module 606 can generate a disaggregation prediction that estimates how much energy is used by the target device, such as at a 1-minute, 5-minute, 15-minute, 30-minute, 45-minute, 1-hour, or other similar granularity.

Combination module 614 can implement a general weighting schema that uses parameters to favor one prediction over the other. For example, one or more parameters can be used to configure weights when combining the generated predictions (e.g., a and/or 13 weights, and first and second thresholds). In this example, based on the values of these parameters, the degree to which the disaggregation prediction is augmented by the detection prediction is configured. In some embodiments, an agreement between the disaggregation prediction and the detection prediction can be sought. For example, at times the disaggregation prediction may predict energy usage for the target device while the detection prediction indicates the device was OFF. Similarly, at times the disaggregation prediction may predict no energy usage for the target device while the detection prediction indicates the device was ON.

In some embodiments, one or more thresholds may be configured to augment the disaggregation prediction when disagreement with the detection prediction exists. For example, a first threshold amount of energy usage can be added to the disaggregation prediction when the detection prediction indicates the target device was ON but the disaggregation prediction includes no predicted energy usage over the relevant time period (e.g., for the relevant 15-minute, 30-minute, 45-minute, or 1-hour time window). In this example, if the disaggregation prediction includes predicted energy usage below the first threshold, the augmentation can include raising the predicted energy usage to the first threshold. Similarly, predicted energy usage from the disaggregation prediction can be reduced to a second threshold amount of energy usage when the detection prediction indicates the target device was OFF but the disaggregation prediction includes predicted energy usage greater than the second threshold over the relevant time period.

In some embodiments, the one or more weighting parameters (e.g., a and 13 weights) can be used to adjust the degree to which the energy usage values of the disaggregation predictions are augmented by the detection predictions. For example, the α weight may relate to the first threshold, and the weight may control the amount of energy usage that is added to the disaggregation prediction. In a sample implementation, if the α weight is set to "1" the energy usage over the relevant time window within the disaggregation prediction can be raised to the first threshold, and if the weight is set to "0" no energy usage will be added. Intermediate values of the α weight between "1" and "0" can add energy usage proportional to the weight. For example, a "0.5" weight can raise the energy usage to half the first threshold, or a delta between the first threshold and the energy usage within the disaggregation prediction over the relevant time period can be determined, and energy usage equal to "0.5" of the delta can be added.

Similarly, the β weight may relate to the second threshold, and the weight may control the amount of reduction in energy usage from the disaggregation prediction. In a sample implementation, if the β weight is set to "1" the energy usage over the relevant time window within the disaggregation prediction can be reduced to the second threshold, and if the weight is set to "0" no reduction is energy usage will be taken. Intermediate values of the β weight between "1" and "0" can reduce energy usage proportional to the weight. For example, a "0.5" weight can reduce the energy usage to 2× the second threshold, or a delta between the second threshold and the energy usage within the disaggregation prediction over the relevant time period can be determined, and energy usage equal to "0.5" of the delta can be subtracted from the disaggregation prediction. In some embodiments, one or any combination of these parameters (e.g., α, β, the first threshold, and/or the second threshold) can be implemented, or any other suitable weighting scheme can be implemented.

In some embodiments, combination module 614 can include a third machine learning model that is trained/configured to combine the disaggregation prediction and the detection prediction. For example, the third trained machine learning model can be trained to predict an amount of energy usage for the target device using the disaggregation prediction and the detection prediction. In some embodiments, the disaggregation prediction and the detection prediction are combined using a prediction generated by the third trained machine learning model. For example, the training data for the third machine learning model can include disaggregation predictions, detection predictions, and labeled (known) energy usage for the target device. In this example, the inputs to the third machine learning model include the disaggregation prediction and detection prediction outputs, and thus the training data includes these predictions together with the labeled (known) energy usage data so that loss and gradient calculations can be performed when training.

In some embodiments, the training data/input to the third machine learning model can also include overall source location (e.g., household) energy usage. For example, this overall source location energy usage is part of the training data used train prediction modules 606 and 610, and also serves as input to prediction modules 606 and 610 to generate the disaggregation predictions and the detection predictions. The third trained machine learning model may find that trends from the overall source location energy usage impact accuracy when combining the disaggregation and detection predictions. Thus, when training the third machine learning model, the overall source location energy usage can be used to learn how to combine these predictions. Similarly, when generating a combination prediction for combining the disaggregation prediction and the detection prediction, both these predictions and the overall source location energy usage can be used as input.

In some embodiments, the third machine learning model can be a deep learning model, for example based on a number of hidden layers implemented. In some embodiments, the disaggregation prediction and the detection prediction are combined by combination module 614 using a decision tree, random forest algorithm, Bayesian learning, or other suitable combination techniques.

Figure 7:
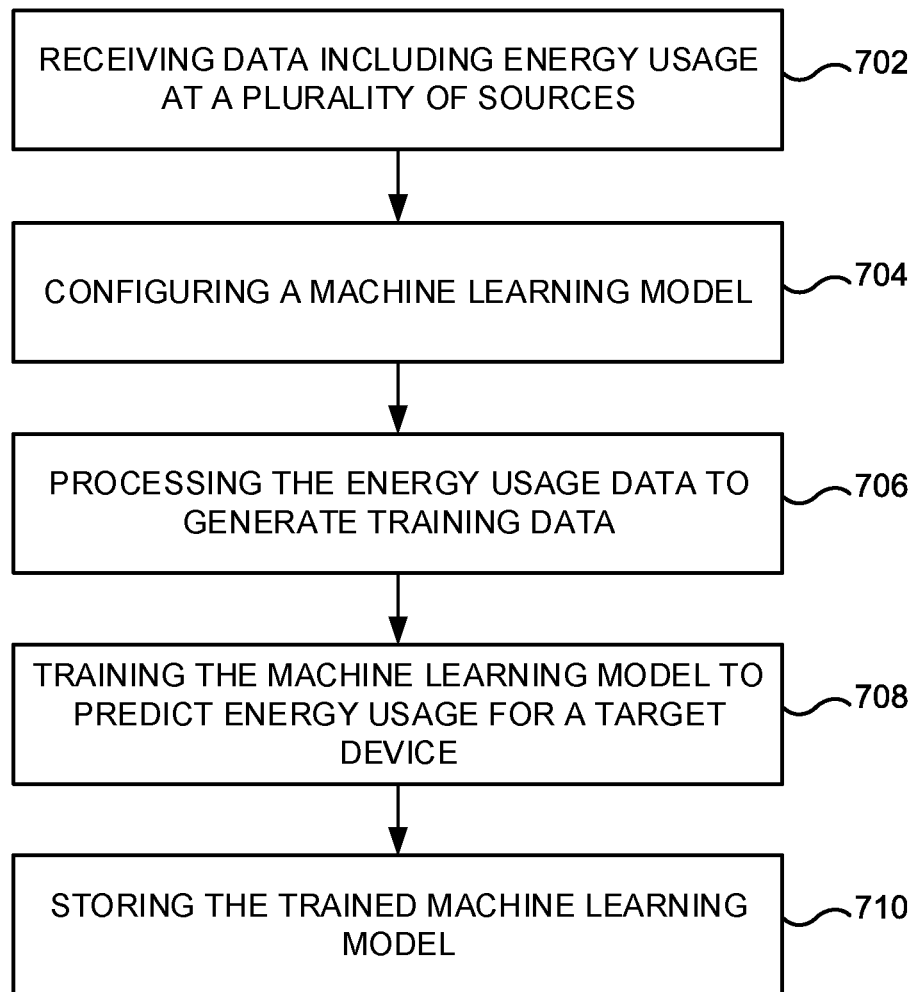
FIG. 7 illustrates a flow diagram for training a machine learning model to disaggregate energy usage associated with a target device according to an example embodiment.

FIG. 7 illustrates a flow diagram for training a machine learning model to disaggregate energy usage associated with a target device according to an example embodiment. In some embodiments, the functionality of FIGS. 7-11 can be implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIGS. 7-11 can be performed by one or more elements of system 200 of FIG. 2.

At 702, energy usage data including energy usage by a target device and one or more non-target devices at a plurality of source locations can be received. For example, the energy usage data can be similar to the data illustrated in Table 1 above. In some embodiments, the received data can include a timestamp, overall energy usage (which includes energy used by a plurality of devices) at a source location (e.g., household), and labeled device specific energy usage for one or multiple of the target and non-target devices. The energy usage data can be received by monitoring energy usage, from a third party, based on a joint venture, or through any other suitable channel or entity.

At 704, a machine learning model can be configured. For example, a machine learning model, such as a neural network, CNN, RNN, Bayesian network, support vector machine, or any other suitable machine learning model, can be configured. Parameters such as a number of layers (e.g., a number of hidden layers), an input shape, an output shape, a breadth, a depth, a direction (e.g., feed forward or bi-directional), activation functions, a type of layer or unit (e.g., gated recurrent unit, long-short term memory, and the like), or other suitable parameters for the machine learning model can be selected. In some embodiments, these configured parameters can be tuned (e.g., adjusted, wholly changed, added, or removed) when training the model.

In some embodiments, the machine learning model can include a CNN. In this case, parameters such as the types of layers (e.g., convolutional, pooling, fully connected, and the like), kernel size and type, stride, and other parameters can also be configured. These configured parameters can also be tuned when training the model.

At 706, the energy usage data can be processed to generate training data. For example, the energy usage data can be processed based on the target device and a set of other devices (e.g., one or more non-target devices) to generate training data. Processing can be based on a correspondence between the energy usage data (e.g., the availability of labeled device specific energy usage for various devices within the energy usage data) and the set of other devices. In some embodiments, the set of other devices can be selected based on the available energy usage data and/or the target device, the energy usage data used to generate the training data can be selected based on the set of other devices and/or target device, or the set of other devices and energy usage data can be considered in combination and they both can be selected based on a correspondence between them (e.g., that benefits training/performance).

In some embodiments, the set of other devices is determined based on the energy usage for a plurality of households within the training data. A number of other devices within the set of other devices can also be based on the energy usage for the plurality of households within the training data. In some embodiments, the set of other devices is determined based on known energy usage values for the set of other devices within the energy usage for the plurality of households within the training data. The set of other devices can be determined such that an amount of training data configured to train the machine learning model given the set of other devices meets a criteria (e.g. threshold amount).

In some embodiments, based on the target device and set of other devices participating in training, the energy usage data can be processed to augment the data with zero value energy usage. For example, an instance (e.g., row) of data can include a timestamp, an overall energy usage at a source location, and a variety of labeled device specific energy usage. When the target device or any of the set of other devices is not included in the labeled device specific energy usage for an instance, zero values can be filled into these missing (or otherwise invalid) entries. In some embodiments, the training data can be processed such that, for a given source location (e.g., household) whose energy usage does not include labeled energy usage from a subset of the set of other devices, the labeled energy usage for the subset of other devices is set to zero. This processing allows for efficient use of available training data, as the learning mechanisms can still learn from much of the training data. In addition, the correspondence between the energy usage data and set of other devices selected for participation in the learning mitigates any potential learning issues that may arise from insertion of the zero values.

At 708, the machine learning model can be trained using the generated training data to predict disaggregated energy usage for the target device. The training can include generation of predictions, loss calculation (e.g., based on a loss function), and gradient propagation (e.g., through layers/neurons of the machine learning model). As discussed herein, labeled energy usage for the target device and labeled energy usage for the set of other devices are both used to train the machine learning model.

In some embodiments, the trained machine learning model is trained using energy usage values for a plurality of households, labeled energy usage values for the target device, and labeled energy usage values for a set of other devices. The training data used to train the machine learning model can include energy usage from a plurality of households, labeled energy usage values for the target device within the energy usage for the households, and labeled energy usage values for the set of other devices within the energy usage for the households. In some embodiments, the training of the machine learning model can optimize an accuracy for predicting energy usage values for the target device.

In some embodiments, the training data, including the energy usage values from the plurality of households, the labeled energy usage values for the target device, and the labeled energy usage values for the set of other devices, has a substantially hourly granularity. Other suitable granularities (e.g., 1-minute, 15-minute, 30-minute, 45-minute, and the like) can similarly be implemented. In some embodiments, the machine learning model, utilized training data, and/or set of other devices can be tuned based on the results of training. For example, testing of a trained model can indicate an accuracy of the trained model, and based on the testing accuracy various tuning adjustments can be made.

At 710, the trained machine learning model can be stored. For example, a trained learning model that generates predictions meeting a criteria (e.g., accuracy criteria or threshold) can be stored such that the stored model can be used to perform disaggregation predictions.

Figure 8:
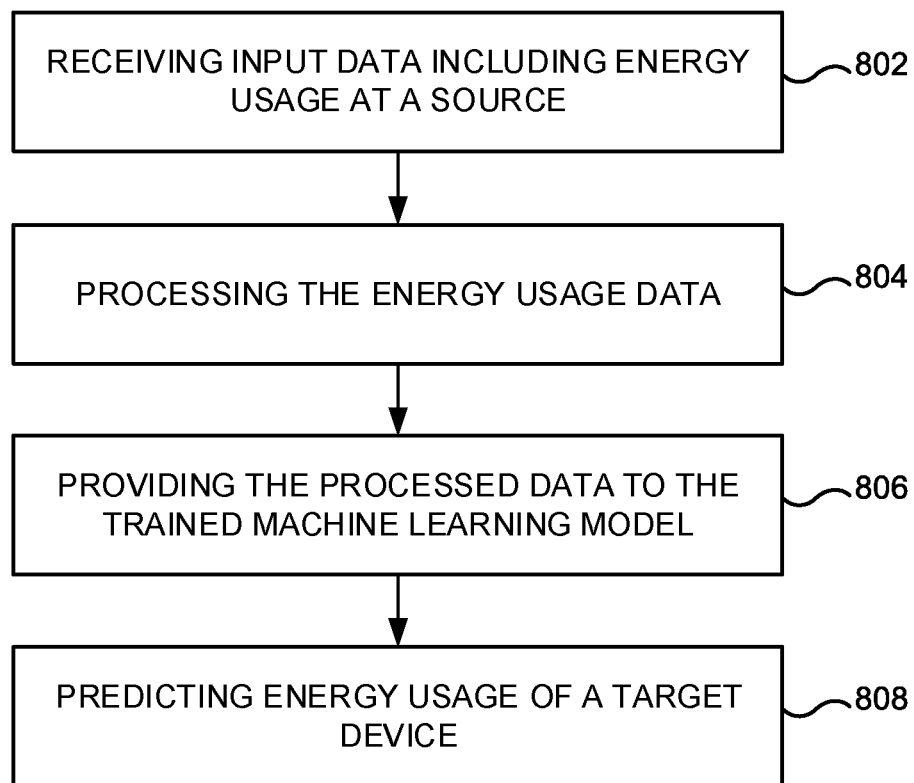
FIG. 8 illustrates a flow diagram for predicting disaggregated energy usage associated with a target device using a trained machine learning model according to an example embodiment.

FIG. 8 illustrates a flow diagram for predicting disaggregated energy usage associated with a target device using a trained machine learning model according to an example embodiment. For example, a machine learning model that is trained based on the functionality of FIG. 7 can be used to perform the functionality of FIG. 8.

At 802, household energy usage data can be received over a period of time, where the household energy usage includes energy consumed by the target device and energy consumed by a plurality of other devices. For example, the household energy usage data can be broken up into time intervals based on timestamps (e.g., at a substantially hourly granularity) over a period of time, such as a day. Other suitable granularities can be implemented.

At 804, the received energy usage data can be processed. For example, the processing can be similar to the processing of the training data. In such an example, the processing can alter the household energy usage input data to be similar to the training data, and thus the trained machine learning model can achieve enhanced prediction results. The processing can include achieving an hourly granularity for the energy usage data, normalization, other forms of scaling, and any other suitable processing.

At 806, the processed data can be provided as input data to the trained machine learning model. For example, a model trained according to the functionality of FIG. 7 can be stored, and the processed data can be provided as input to the trained model. At 808, predictions can be generated by the trained machine learning model. For example, disaggregated energy usage for the target device based on the overall energy usage received can be predicted by the trained machine learning model.

In some embodiments, the predictions can have a similar granularity to the input provided to the trained model. For example, the predicted energy disaggregation for the target device can have a substantially hourly granularity. In some embodiments, the predicted energy usage includes predicted energy usage for the target device over at least a day with at least a substantially hourly granularity.

Figure 9:
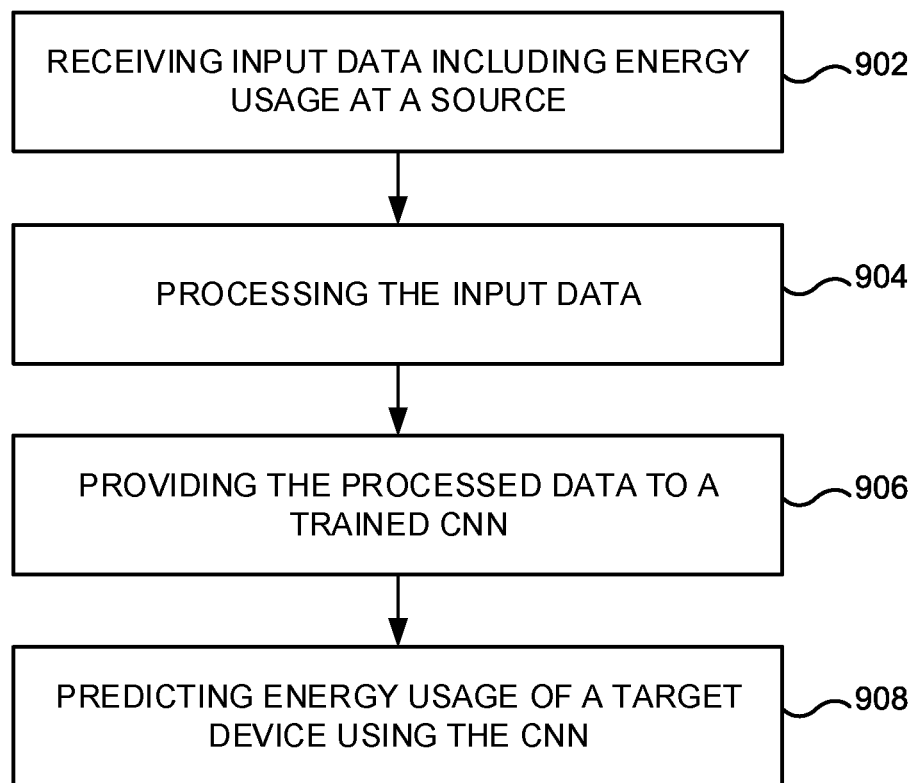
FIG. 9 illustrates a flow diagram for predicting disaggregated energy usage associated with a target device using a trained convolutional neural network according to an example embodiment.

FIG. 9 illustrates a flow diagram for predicting disaggregated energy usage associated with a target device using a trained convolutional neural network according to an example embodiment. For example, a convolutional neural network that is trained based on the functionality of FIG. 7 can be used to perform the functionality of FIG. 9.

In some embodiments, the functionality of FIG. 7 can be used to train a CNN with a mix of convolutional and fully connected layers. For example, the CNN can include a number of convolutional layers that are followed by one or more fully connected layers. The CNN can be similar to the network illustrated in FIG. 4A and/or FIG. 4B. For example, one of the CNN layers can be a convolutional layer with a 1-dimensional kernel of a first size and another of the CNN layers can be a convolutional layer with a 1-dimensional kernel of a second size. In some embodiments, the first size is less than the second size. In some embodiments, at least two of the CNN layers can be convolutional layers in parallel, and a concatenation layer can be used to concatenate the parallel branches within the CNN, as depicted in FIG. 4B. In such an embodiment, the parallel branches can be configured to learn different features of the input/training data. For example, a kernel size, stride, and padding implemented for a first of the parallel branches can be different from a kernel size, stride, and padding implemented for a second of the parallel branches.

At 902, input data including energy usage data at a source location over a period of time can be received. For example, the source location can be a household, and the household energy usage can include energy consumed by the target device and energy consumed by a plurality of other devices. For example, the source location energy usage can be broken up into time intervals based on timestamps (e.g., at a substantially hourly granularity) over a period of time, such as a day.

At 904, the received energy usage data can be processed. For example, the processing can be similar to the processing of the training data. In such an example, the processing can alter the source location energy usage input data to be similar to the training data, and thus the trained machine learning model can achieve enhanced prediction results. The processing can include achieving the hourly granularity for the energy usage data, normalization, other forms of scaling, and any other suitable processing.

At 906, the processed data can be provided as input data to the trained convolutional neural network. For example, a convolutional neural network trained according to the functionality of FIG. 7 can be stored, and the processed data can be provided as input to the trained network. At 908, predictions can be generated by the trained convolutional neural network. For example, disaggregated energy usage for the target device based on the overall energy usage received can be predicted by the trained convolutional neural network. In some embodiments, predicting the disaggregated target device energy usage includes at least a feed forward progression of the input data through the trained CNN such that a shape of the input data is changed between a first layer (with a first 1-dimensional kernel) and a second layer (with a second 1-dimensional kernel). In some embodiments, the first layer and the second layer comprise a parallel orientation within the CNN.

In some embodiments, the predictions can have a similar granularity to the input provided to the trained network. For example, the predicted energy disaggregation for the target device can have a substantially hourly granularity. In some embodiments, the predicted energy usage includes predicted energy usage for the target device over at least a day with at least a substantially hourly granularity.

Figure 10:
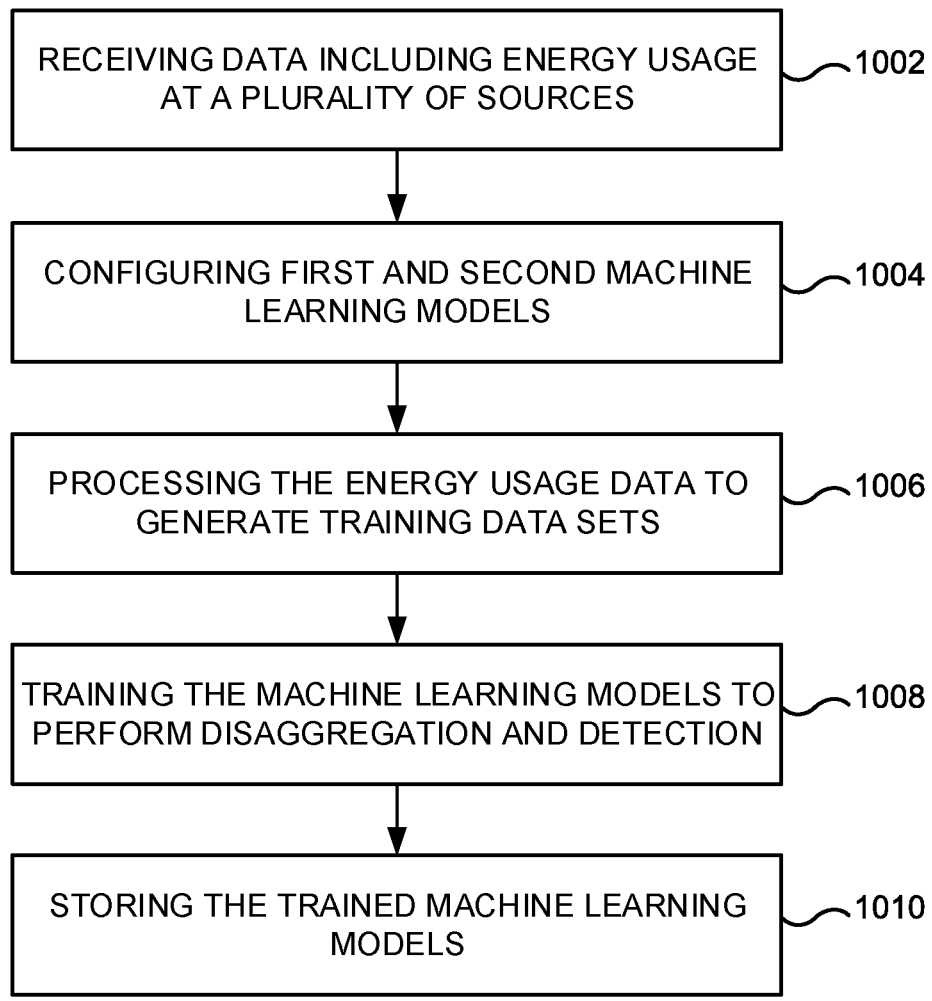
FIG. 10 illustrates a flow diagram for training multiple machine learning models to disaggregate energy usage associated with a target device according to an example embodiment.

FIG. 10 illustrates a flow diagram for training multiple machine learning models to disaggregate energy usage associated with a target device according to an example embodiment. At 1002, energy usage data including energy usage by a target device and one or more non-target devices at a plurality of source locations can be received. For example, the energy usage data can be similar to the data illustrated in Table 1 above. In some embodiments, the received data can include a timestamp, overall energy usage (which includes energy used by a plurality of devices) at a source location (e.g., household), and labeled device specific energy usage for one or multiple of the target and non-target devices. The energy usage data can be received by monitoring energy usage, from a third party, based on a joint venture, or through any other suitable channel or entity.

At 1004, a first machine learning model and a second machine learning model can be configured. For example, machine learning models, such as a neural network, CNN, RNN, Bayesian network, support vector machine, or any other suitable machine learning model, can be configured. Parameters such as a number of layers (e.g., a number of hidden layers), an input shape, an output shape, a breadth, a depth, a direction (e.g., feed forward or bi-directional), activation functions, a type of layer or unit (e.g., gated recurrent unit, long-short term memory, and the like), or other suitable parameters for the machine learning models can be selected. In some embodiments, these configured parameters can be tuned (e.g., adjusted, wholly changed, added, or removed) when training the models.

In some embodiments, the first machine learning model can be designed/configured to disaggregate target device energy usage from within source location energy usage. For example, the machine learning model can be similar to one designed/trained and/or implemented in FIGS. 7, 8, and 9. In some embodiments, the second machine learning model can be designed/configured to detect target device energy usage from within source location energy usage. For example, detection can differ from disaggregation in that disaggregation aims to determine an amount of energy usage by the target device while detection aims to detect energy usage above a threshold by the target device. Implementations of detection can aim to detect energy usage above a threshold to distinguish between the target device being ON and using energy and a standby mode for the target device (which may draw a low level of energy). This threshold value used to distinguish between standby mode (which can be interpreted as OFF) and ON can be dependent on the target device. In some embodiments, a predicted disaggregation can take a numeric value (e.g., over a range of values) while predicted detection can be binary (e.g., ON or OFF).

At 1006, the energy usage data can be processed to generate training data sets. For example, the energy usage data can be processed based on the target device and a set of other devices (e.g., one or more non-target devices) to generate training data sets. Processing can be based on a correspondence between the energy usage data (e.g., the availability of labeled device specific usage for various devices within the energy usage data) and the set of other devices. In some embodiments, the set of other devices can be selected based on the available energy usage data and/or the target device, the energy usage data used to generate the training data can be selected based on the set of other devices and/or target device, or the set of other devices and energy usage data can be considered in combination and they both can be selected based on a correspondence between them (e.g., that benefits training/performance).

In some embodiments, the set of other devices is determined based on the energy usage for a plurality of households within the training data. A number of other devices within the set of other devices can also be based on the energy usage for the plurality of households within the training data. In some embodiments, the set of other devices is determined based on known energy usage values for the set of other devices within the energy usage for the plurality of households within the training data. The set of other devices can be determined such that an amount of training data configured to train the machine learning model given the set of other devices meets a criteria (e.g. threshold amount).

In some embodiments, based on the target device and set of other devices participating in training, the energy usage data can be processed to augment the data with zero value energy usage. For example, an instance (e.g., row) of data can include a timestamp, an overall energy usage at a source location, and a variety of labeled device specific energy usage. When the target device or any of the set of other devices is not included in the labeled device specific energy usage for an instance, zero values can be filled into these missing (or otherwise invalid) entries. In some embodiments, the training data can be processed such that, for a given source location (e.g., household) whose energy usage does not include labeled energy usage from a subset of the set of other devices, the labeled energy usage for the subset of other devices is set to zero. This processing allows for efficient use of available training data, as the learning mechanisms can still learn from most of the training data. In addition, the correspondence between the energy usage data and set of other devices selected for participation in the learning mitigates any potential learning issues that may arise from insertion of the zero values.

In some embodiments, processing the energy usage data can include generating a first set of training data for the first machine learning model and a second set of training data for the second machine learning model. For example, the first machine learning model, which generates disaggregation predictions, is trained using labeled energy usage data that includes an amount of energy used (e.g., over a timespan). Accordingly, the labeled device specific energy data within the first set of training data can include labeled device specific energy usage that reflects an amount of energy used, such as those represented in Tables 1-6 above. In some embodiments, the second machine learning model, which generates detection predictions, is trained using labeled energy usage data that includes detected energy usage (e.g., over a timespan). Accordingly, the labeled device specific energy data within the second set of training data can include labeled device specific energy usage that represents whether energy beyond a threshold was used (e.g., a binary value that represents on or off).

In some embodiments, the second set of training data can be generated by setting any labeled device specific energy usage value above the threshold value to 1 and any labeled device specific energy usage value below the threshold value to 0. For example, the labeled device specific energy usage of the second set training data may not include an amount of energy usage for the labeled devices (and instead includes a binary 1 or 0).

At 1008, the first machine learning model and the second machine learning model can be trained using the generated first training data set and second training data set to predict disaggregated energy usage for the target device (e.g., an amount of energy usage) and detected energy usage for the target device (e.g., ON or OFF detection, such as energy usage above a threshold). The training can include generation of predictions, loss calculation (e.g., based on a loss function), and gradient propagation (e.g., through layers/neurons of the machine learning model). As discussed herein, labeled energy usage for the target device and labeled energy usage for the set of other devices are both used to train the machine learning models.

In some embodiments, the trained machine learning models are trained using energy usage values for a plurality of households, labeled energy usage values for the target device, and labeled energy usage values for a set of other devices. The first set training data and second set of training data used to train the first machine learning model and second machine learning model can include energy usage from a plurality of households, labeled energy usage values for the target device within the energy usage for the households, and labeled energy usage values for the set of other devices within the energy usage for the households. In some embodiments, the training of the first machine learning model can optimize an accuracy for predicting energy usage values for the target device (e.g., an amount of energy usage) and the training of the second machine learning model can optimize an accuracy for predicting detected energy usage for the target device (e.g., ON or OFF detection, such as energy usage above a threshold).

In some embodiments, the first set of training data and the second set of training data, including the energy usage values from the plurality of households, the labeled energy usage values for the target device, and the labeled energy usage values for the set of other devices, has a substantially hourly granularity. Other suitable granularities can similarly be implemented. In some embodiments, the machine learning models, utilized training data sets, and/or set of other devices can be tuned based on the results of training. For example, testing of a trained model can indicate an accuracy of the trained model, and based on the testing accuracy various tuning adjustments can be made.

At 1010, the trained first machine learning model and trained second machine learning model can be stored. For example, the trained learning models that generate predictions meeting a criteria (e.g., accuracy criteria or threshold) can be stored such that the stored models can be used to perform disaggregation and detection predictions.

Figure 11:
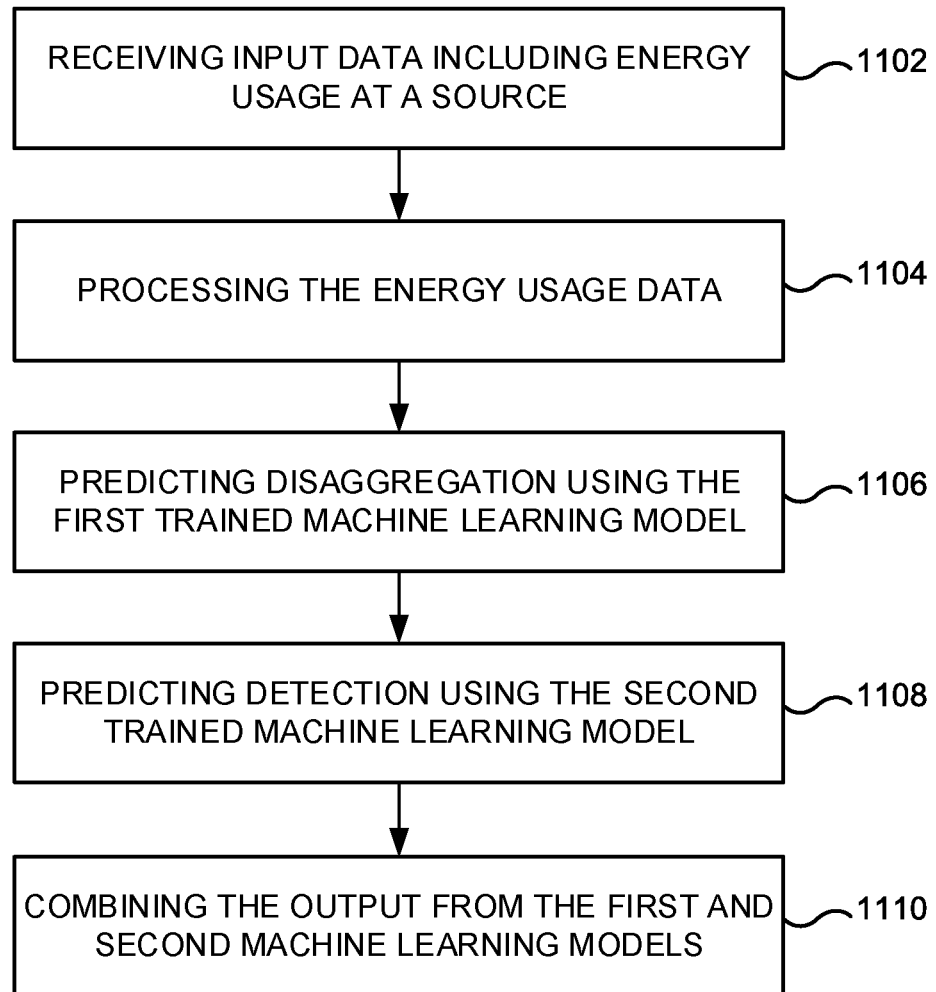
FIG. 11 illustrates a flow diagram for predicting disaggregated energy usage associated with a target device using multiple trained machine learning models according to an example embodiment.

FIG. 11 illustrates a flow diagram for predicting disaggregated energy usage associated with a target device using multiple trained machine learning models according to an example embodiment. For example, multiple machine learning models that are trained based on the functionality of FIG. 10 can be used to perform the functionality of FIG. 11.

At 1102, household energy usage data can be received over a period of time at substantially an hourly granularity, where the household energy usage includes energy consumed by the target device and energy consumed by a plurality of other devices. For example, the household energy usage data can be broken up into time intervals based on timestamps (e.g., at a substantially hourly granularity, or other suitable granularity) over a period of time, such as a day.

At 1104, the received energy usage data can be processed. For example, the processing can be similar to the processing of the training data. In such an example, the processing can alter the household energy usage input data to be similar to the training data, and thus the trained machine learning model can achieve enhanced prediction results. The processing can include achieving the hourly granularity for the energy usage data, normalization, other forms of scaling, and any other suitable processing.

In some embodiments, the processing can include generating first input data for the first trained machine learning model and second input data for the second trained machine learning model. For example, the first machine learning model can be trained/configured to disaggregate target device energy usage from the input data and the second machine learning model can be trained/configured to detected target device energy usage from the input data.

At 1106, the first input data can be provided to the first trained machine learning model, and predictions for disaggregated energy usage from within the source location energy usage data can be generated. For example, an amount of disaggregated target device energy usage over the period of time based on the received household energy usage can be predicted by the first trained machine learning model.

In some embodiments, the first trained machine learning model can be trained according to the functionality of FIG. 10, and first input data can be provided as input to the trained model. In some embodiments, the predictions can have a similar granularity to the first input/energy usage data provided to the trained model. For example, the predicted energy disaggregation for the target device can have a substantially hourly granularity. In some embodiments, the predicted energy usage includes predicted energy usage for the target device over at least a day with at least a substantially hourly granularity.

At 1108, the second input data can be provided to the second trained machine learning model, and predictions for detected energy usage from within the source location energy usage data can be generated. For example, detected target device energy usage over the period of time based on the received household energy usage can be predicted by the second trained machine learning model.

In some embodiments, the second trained machine learning model can be trained according to the functionality of FIG. 10, and second input data can be provided as input to the trained model. In some embodiments, the predictions can have a similar granularity to the second input/energy usage data provided to the trained model. For example, the predictions for the detected energy usage for the target device can have a substantially hourly granularity. In some embodiments, the predictions for the detected energy usage includes detected energy usage for the target device over at least a day with at least a substantially hourly granularity.

At 1110, the predicted output from the first machine learning model and the second machine learning model can be combined. For example, the disaggregation prediction and the detection prediction can be combined to form a combined prediction for the disaggregation of energy usage for the target device.

In some embodiments, combining the disaggregation prediction and the detection prediction includes adding value to the predicted disaggregation for the target device based on the detection prediction, such as when the detection prediction is inconsistent with the disaggregation prediction. In some embodiments, the disaggregation prediction and the detection prediction are combined using a weighting scheme that resolves discrepancies between the predictions.

In some embodiments, a third machine learning model can be trained, wherein the third machine learning model is trained/configured to combine the disaggregation prediction and the detection prediction. For example, the third trained machine learning model can be trained to predict an amount of energy usage for the target device using the disaggregation prediction and the detection prediction. In some embodiments, the disaggregation prediction and the detection prediction are combined using the prediction generated by the third trained machine learning model.

Embodiments perform non-intrusive load monitoring using a novel learning scheme. NILM and disaggregation refers to taking as input total energy usage at a source location (e.g., energy usage at a household provided by advanced metering infrastructure) and estimating energy usage for one or more appliances, electric vehicles, and other devices that use energy at the source location. Embodiments leverage a trained machine learning model to predict energy usage of a target device based on general energy usage at a source location. For example, the target device may be a large appliance or electrical vehicle, the source location may be a household, and the trained machine learning model can receive the energy usage of the household as input and predict the energy usage of the target device (e.g., energy usage of the target device that is included in the energy usage of the household as a whole).

Embodiments train a machine learning model using labeled energy usage data. For example, a machine learning model can be designed/selected, such as a neural network. Energy usage data from multiple source locations (e.g., households) can be obtained, where the energy usage data can be labeled with device specific energy usage. For example, the household energy usage values can cover a period of time, and within that period of time individual device energy usage values (e.g., appliance 1, electric vehicle 1, appliance 2, and the like) can be labeled. In some embodiments, this household and device specific energy usage can then be processed to generate training data for the machine learning model.

In some embodiments, the machine learning model can be trained to predict (e.g., disaggregate) energy usage for a target device. For example, the training data can include target device specific energy usage at a number of different source locations (e.g., households), and thus the machine learning model can be trained to identify trends in the training data and predict target device energy usage. In some embodiments, while the machine learning model is trained to predict target device energy usage, the training can include energy usage predictions/loss calculations/gradient updates for one or more other devices. For example, a set of other devices can be included with the target device when implementing embodiments of the training techniques (e.g., prediction generation, loss calculation, gradient propagation, accuracy improvements, and the like) for the machine learning model.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for detecting and disaggregating energy usage associated with a target device, the method comprising:
    storing a first trained machine learning model configured to disaggregate target device energy usage from source location energy usage, wherein the first trained machine learning model is trained to predict an amount of energy usage for the target device from source location energy usage;
    storing a second trained machine learning model configured to detect target device energy usage from source location energy usage, wherein the second trained machine learning model is trained to predict a target device classification for source location energy usage, wherein at least a first classification prediction represents detection of target device energy usage within source location energy usage and a second classification prediction represents that target device energy usage is not detected within the source location energy usage;
    receiving source location energy usage over a period of time, wherein the source location energy usage includes energy consumed by the target device;
    generating, based on the received source location energy usage, disaggregation predictions for the target device using the first trained machine learning model and detection predictions for the target device using the second trained machine learning model; and
    predicting, by combining the disaggregation predictions and the detection predictions, an amount of disaggregated target device energy usage over the period of time, wherein the disaggregate target device energy usage is used to perform energy grid demand planning, the energy grid being controlled at least in part based on the demand planning.

2. The method of claim 1, wherein the first machine learning model is trained using first training data comprising labeled device specific energy usage within overall source location energy usage for a plurality of source locations and the second machine learning model is trained using second training data comprising labeled device specific energy usage within overall source location energy usage for a plurality of source locations, and the labeled device specific energy usage of the first training data includes an amount of energy usage for the labeled devices.

3. The method of claim 2, wherein the labeled device specific energy usage of the second training data does not include an amount of energy usage for the labeled devices.

4. The method of claim 3, wherein the source locations comprise households, the received source location energy usage comprises an hourly granularity, the first training data comprises an hourly granularity, and the second training data comprises an hourly granularity.

5. The method of claim 1, wherein combining the disaggregation predictions and the detection predictions comprises adding value to the predicted disaggregation for the target device energy usage based on the detection predictions.

6. The method of claim 5, wherein the disaggregation predictions and the detection predictions are combined using a weighting scheme that resolves discrepancies.

7. The method of claim 6, further comprising: storing a third trained machine learning model configured to combine the disaggregation predictions and the detection predictions, wherein the third trained machine learning model is trained to predict an amount of energy usage for the target device using the disaggregation predictions and the detection predictions.

8. The method of claim 7, wherein the disaggregation predictions and the detection predictions are combined using the predictions generated by the third trained machine learning model.

9. The method of claim 1, wherein the predicted amount of disaggregated target device energy usage comprises predicted energy usage for the target device over at least a day with at least an hourly granularity.

10. The method of claim 1, wherein the first classification prediction corresponds to a prediction that the target device is in an "ON" state and the second classification prediction corresponds to a prediction that the target device is in an "OFF" state.

11. The method of claim 1, wherein the disaggregation predictions and the detection predictions are generated at a frequency granularity, and the disaggregation predictions and detection predictions generated at the frequency granularity cover the period of time.

12. A system for detecting and disaggregating energy usage associated with a target device, the system comprising:
  a processor; and
  a memory storing instructions for execution by the processor, the instructions configuring the processor to:
  store a first trained machine learning model configured to disaggregate target device energy usage from source location energy usage, wherein the first trained machine learning model is trained to predict an amount of energy usage for the target device from source location energy usage;
  store a second trained machine learning model configured to detect target device energy usage from source location energy usage, wherein the second trained machine learning model is trained to predict a target device classification for source location energy usage, wherein at least a first classification prediction represents detection of target device energy usage within source location energy usage and a second classification prediction represents that target device energy usage is not detected within the source location energy usage;
  receive source location energy usage over a period of time, wherein the source location energy usage includes energy consumed by the target device;
  generating, based on the received source location energy usage, disaggregation predictions for the target device using the first trained machine learning model and detection predictions for the target device using the second trained machine learning model; and
  predict, by combining the disaggregation predictions and the detection predictions, an amount of disaggregated target device energy usage over the period of time, wherein the disaggregated target device energy usage is used to perform energy grid demand planning, the energy grid being controlled at least in part based on the demand planning.

13. The system of claim 12, wherein the first machine learning model is trained using first training data comprising labeled device specific energy usage within overall source location energy usage for a plurality of source locations and the second machine learning model is trained using second training data comprising labeled device specific energy usage within overall source location energy usage for a plurality of source locations, and the labeled device specific energy usage of the first training data includes an amount of energy usage for the labeled devices.

14. The system of claim 13, wherein the labeled device specific energy usage of the second training data does not include an amount of energy usage for the labeled devices.

15. The system of claim 14, wherein the source locations comprise households, the received source location energy usage comprises an hourly granularity, the first training data comprises an hourly granularity, and the second training data comprises an hourly granularity.

16. The system of claim 12, wherein combining the disaggregation predictions and the detection predictions comprises adding value to the predicted disaggregation for the target device energy usage based on the detection predictions.

17. The system of claim 16, wherein the disaggregation predictions and the detection predictions are combined using a weighting scheme that resolves discrepancies.

18. The system of claim 17, wherein the instructions configure the processor to: store a third trained machine learning model configured to combine the disaggregation predications and the detection predictions, wherein the third trained machine learning model is trained to predict an amount of energy usage for the target device using the disaggregation predictions and the detection predictions.

19. The system of claim 18, wherein the disaggregation predictions and the detection predictions are combined using the predictions generated by the third trained machine learning model.

20. A non-transitory computer readable medium having instructions stored thereon that, when executed by a processor, cause the processor to detect and disaggregate energy usage associated with a target device, wherein, when executed, the instructions cause the processor to:
  store a first trained machine learning model configured to disaggregate target device energy usage from source location energy usage, wherein the first trained machine learning model is trained to predict an amount of energy usage for the target device from source location energy usage;
  store a second trained machine learning model configured to detect target device energy usage from source location energy usage, wherein the second trained machine learning model is trained to predict a target device classification for source location energy usage, wherein at least a first classification prediction represents detection of target device energy usage within source location energy usage and a second classification prediction represents that target device energy usage is not detected within the source location energy usage;
  receive source location energy usage over a period of time, wherein the source location energy usage includes energy consumed by the target device;
  generating, based on the received source location energy usage, disaggregation predictions for the target device using the first trained machine learning model and detection predictions for the target device using the second trained machine learning model; and
  predict, by combining the disaggregation predictions and the detection predictions, an amount of disaggregated target device energy usage over the period of time, wherein the disaggregated target device energy usage is used to perform energy grid demand planning, the energy grid being controlled at least in part based on the demand planning.

* * * * *